(12) United States Patent
Safa-Bakhsh et al.

(10) Patent No.: US 8,914,149 B2
(45) Date of Patent: Dec. 16, 2014

(54) PLATFORM HEALTH MONITORING SYSTEM

(71) Applicant: The Boeing Company, Chicago, IL (US)

(72) Inventors: Robab Safa-Bakhsh, Ambler, PA (US); Patrick Neal Harris, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 100 days.

(21) Appl. No.: 13/655,169

(22) Filed: Oct. 18, 2012

(65) Prior Publication Data

US 2013/0304307 A1  Nov. 14, 2013

Related U.S. Application Data

(63) Continuation-in-part of application No. 12/577,549, filed on Oct. 12, 2009, now abandoned.

(51) Int. Cl.
G06F 19/00 (2011.01)

(52) U.S. Cl.
USPC ........................................... 700/245

(58) Field of Classification Search
None
See application file for complete search history.

(56) References Cited

U.S. PATENT DOCUMENTS

| | | | |
|---|---|---|---|
| 4,144,564 A | 3/1979 | Lamb | |
| 4,149,262 A | 4/1979 | Lamb et al. | |
| 5,014,327 A | 5/1991 | Potter et al. | |
| 5,987,446 A | 11/1999 | Corey et al. | |
| 6,581,049 B1 | 6/2003 | Aparicio, IV et al. | |
| 6,711,523 B2 | 3/2004 | Bechhoefer et al. | |
| 6,714,393 B2 | 3/2004 | Nostrand | |
| 6,714,893 B2 | 3/2004 | Busche et al. | |
| 7,016,886 B2 | 3/2006 | Cabana et al. | |
| 7,027,953 B2 | 4/2006 | Klein | |
| 7,062,483 B2 | 6/2006 | Ferrari et al. | |
| 7,194,975 B2 | 3/2007 | Potter et al. | |
| 7,325,201 B2 | 1/2008 | Ferrari et al. | |
| 7,333,917 B2 | 2/2008 | Greis et al. | |
| 7,428,528 B1 | 9/2008 | Ferrari et al. | |

(Continued)

FOREIGN PATENT DOCUMENTS

| | | |
|---|---|---|
| EP | 1455313 | 9/2004 |
| EP | 2063399 | 5/2009 |
| WO | WO0218879 | 3/2002 |
| WO | WO2011046684 | 4/2011 |

OTHER PUBLICATIONS

Harris, "Evaluating the Health Status of a System," USPTO U.S. Appl. No. 13/136,972, filed Aug. 16, 2011, 54 pages.

(Continued)

Primary Examiner — Bhavesh V Amin
(74) Attorney, Agent, or Firm — Yee & Associates, P.C.

(57) ABSTRACT

A platform health monitoring system including an associative memory. The associative memory stores a plurality of known health profiles for a platform. The platform health monitoring system also includes an input device in communication with the associative memory. The input device is configured to receive a current health profile of the platform. The platform health monitoring system also may include a comparator configured to compare, in conjunction with the associative memory, the current health profile with the plurality of known health profile to generate a comparison. The comparator is further configured to generate, based on the comparison and in conjunction with the associative memory, a report on a current health of the platform.

17 Claims, 12 Drawing Sheets

(56) References Cited

U.S. PATENT DOCUMENTS

| | | |
|---|---|---|
| 7,478,090 B2 | 1/2009 | Aparicio, IV et al. |
| 7,478,192 B2 | 1/2009 | Fleming et al. |
| 7,565,491 B2 | 7/2009 | Lemen et al. |
| 7,567,957 B2 | 7/2009 | Ferrari et al. |
| 7,574,416 B2 | 8/2009 | Aparicio, IV et al. |
| 7,581,702 B2 | 9/2009 | Olson et al. |
| 7,657,496 B2 | 2/2010 | Aparicio, IV |
| 7,882,394 B2 | 2/2011 | Hosek et al. |
| 7,904,195 B2 | 3/2011 | Chao et al. |
| 7,912,823 B2 | 3/2011 | Ferrari et al. |
| 8,019,752 B2 | 9/2011 | Ferrari et al. |
| 8,160,981 B2 | 4/2012 | Aparicio, IV |
| 2002/0059088 A1 | 5/2002 | Whalen et al. |
| 2003/0074159 A1 | 4/2003 | Bechhoefer et al. |
| 2003/0158702 A1 | 8/2003 | Busche et al. |
| 2005/0038781 A1 | 2/2005 | Ferrari et al. |
| 2005/0096873 A1 | 5/2005 | Klein |
| 2005/0278362 A1 | 12/2005 | Maren et al. |
| 2006/0005758 A1 | 1/2006 | Potter et al. |
| 2006/0053104 A1 | 3/2006 | Ferrari et al. |
| 2006/0095653 A1 | 5/2006 | Fleming et al. |
| 2007/0033346 A1 | 2/2007 | Lemen et al. |
| 2007/0038838 A1 | 2/2007 | Greis et al. |
| 2007/0050104 A1* | 3/2007 | Wallace et al. ............... 701/29 |
| 2007/0067678 A1 | 3/2007 | Hosek et al. |
| 2007/0106658 A1 | 5/2007 | Ferrari et al. |
| 2007/0299797 A1 | 12/2007 | Aparicio, IV |
| 2008/0097945 A1 | 4/2008 | Greis et al. |
| 2008/0109411 A1 | 5/2008 | Young et al. |
| 2008/0133479 A1 | 6/2008 | Zelevinsky et al. |
| 2008/0134100 A1 | 6/2008 | Ferrari et al. |
| 2008/0177683 A1 | 7/2008 | No et al. |
| 2008/0270328 A1 | 10/2008 | Lafferty et al. |
| 2008/0312783 A1 | 12/2008 | Mansouri et al. |
| 2009/0083207 A1 | 3/2009 | Aparicio, IV |
| 2009/0198692 A1 | 8/2009 | Aparicio, IV et al. |
| 2010/0205121 A1 | 8/2010 | Quadracci et al. |
| 2010/0205192 A1 | 8/2010 | Quadracci et al. |
| 2010/0205212 A1 | 8/2010 | Quadracci et al. |
| 2011/0087387 A1 | 4/2011 | Safa-Bakhsh et al. |
| 2013/0046714 A1 | 2/2013 | Harris |

OTHER PUBLICATIONS

Office Action, dated Oct. 15, 2012, regarding USPTO U.S. Appl. No. 13/136,972, 26 pages.

Park et al., "Analysis of Space Shuttle Main Engine Data Using Beacon-Based Exception Analysis for Multi-Missions", IEEE Aerospace Conference Proceedings, vol. 6, Mar. 2002, pp. 6-2835-6-2844.

Patterson-Hine et al., "A Review of Diagnostic techniques for ISHM Applications", pp. 1-22, retrieved Oct. 9, 2009 http://ti.arc.nasa.gov/m/pub/1094h/1094%20(APH).pdf.

PCT search report dated Nov. 16, 2010 regarding application PCT/US2010/047742.

Pecheur et al., "From Livingstone to SMV, Formal Verification for Autonomous Spacecrafts", pp. 1-11, retrieved Oct. 9, 2009 http://www.cs.cmu.edu/~reids/papers/Model-Checking-IROS00.pdf.

Prokopenko et al., "Optimizing Associative Information Transfer Within Content-addressable Memory," International Journal of Unconventional Computation, vol. 3, Issue 3, Special issue: "Towards Theory of Unconventional Computing," 2008, pp. 273-296.

Przytula et al., "Reasoning Framework for Diagnosis and Prognosis", 2007 IEEE Aerospace Conference, Mar. 2007, pp. 1-10.

Reichard, "Applications of Data Mining in Automated ISHM and Control for Complex Engineering Systems", Penn State University, pp. 1-23, retrieved Oct. 9, 2009 https://dashlink.arc.nasa.gov/static/dashlink/media/topic/Reichard_DataMining.ppt.pdf.

Ritter et al., "Morphological Associative Memories", IEEE Transactions on Neural Networks, vol. 9, Iss. 2, Mar. 1998, 31 pp.

Roemer et al., "An Overview of Selected Prognostic Technologies with Application to Engine Health Management", Proceedings of GT2006 ASME Turbo Expo 2006: Power for Land Sea and Air, May 2006, pp. 707-715.

Roemer et al., "Prognostics and Health Management Software for Gas Turbine Engine Bearings", Proceedings of GT2007 ASME Turbo Expo 2007: Power for Land Sea and Air, May 2007, pp. 1-8.

Saha et al., "An Integrated Approach to Battery Health Monitoring Using Bayesian Regression and State Estimation", 2007 IEEE Autotestcon, Sep. 2007, pp. 646-653.

Sandborn, "A Data Mining Based Approach to Electronic Part Obsolescence Forecasting", IEEE Transactions on Components and Packaging Technologies, vol. 30, Iss. 3, Sep. 2007, pp. 397-401.

Saxena et al., "Integrated Diagnosis and Prognosis Architecture for Fleet Vehicles Using Dynamic Case-Based Reasoning", 2005 IEEE Autotestcon, Sep. 2005, pp. 96-102.

Schwabacher et al., "A Survey of Artificial Intelligence for Prognostics", NASA Ames Research Center, Moffett Field, CA, Sep. 2007, pp. 1-8.

Schwabacher "A Survey of Data-Driven Prognostics", Proceedings of the American Institute of Aeronautics and Astronautics Infotech Aerospace Conference, Sep. 2005, pp. 1-5.

Shao et al., "Prognosis of remaining bearing life using neural networks", Proceedings of the Institute of Mechanical Engineers, Part I, Journal of Systems and Control Engineering, vol. 214, Iss. 3, 2000, pp. 217-231.

Sharda, "Neural Networks for the MS/OR Analyst: An Application Bibliography", 1994, The Institute of Management Sciences, Interfaces, vol. 24, No. 2, Mar. 1994, pp. 116-130.

Starzyk et al., "Spatio-Temporal Memories for Machine Learning: A Long-Term Memory Organization", IEEE Transactions on Neural Networks, vol. 20, Iss. 5, May 2009, pp. 768-780.

Stone et al., "Neural Net Based Prognostics for an Industrial Semiconductor Fabrication System", IEEE International Conference on Systems, Man and Cybernetics, vol. 2, Oct. 2005, pp. 1512-1517.

Studer et al., "On the Structure of a Neuro-Fuzzy System to Forecast Chaotic Time Series", International Symposium on Neuro-Fuzzy Systems, Aug. 1996. pp. 103-110.

Tang et al., "Prognostics in the Control Loop", Association for the Advancement of Artificial Intelligence, Sep. 2007, pp. 128-135.

Vichare et al., "Prognostics and Health Management of Electronics", IEEE Transactions on Components and Packaging Technologies, vol. 29, No. 1, Mar. 2006, pp. 1-8.

Volponi, "Data Fusion for Enhanced Aircraft Engine Prognostics and Health Management", NASA/CR 2005-214055, Dec. 2005, pp. 1-36.

Watson et al., "Dynamic Modeling and Wear-Based Remaining Useful Life Prediction of High Power Clutch Systems", Tribology Transactions, vol. 48, No. 2, Apr. 2005, pp. 208-217, 2005.

Watson et al., "Improving the Maintenance process and Enabling Prognostics for Control Actuators Using CAHM Software", 2006 IEEE Aerospace Conference, Jul. 2006, pp. 1-8.

Werbos, "Generalization of Backpropagation with Application to a Recurrent Gas Market Model", Neural Networks, vol. 1, Iss. 4, 1988, pp. 339-356.

Williams et al., "A Model-based Approach to Reactive Self-Configuring Systems", In Proceedings of AAAI-96, 1996, pp. 971-978.

Zhang, "Optimum Sensor Localization/Selection in a Diagnostic/Prognostic Architecture", Jan. 2005, dissertation George Institute of Technology, pp. 1-126.

Xue et al., "An Instance-Based Method for Remaining Useful Life Estimationf or Aircraft Engines", Journal of Failure Analysis and Prevention, vol. 8, No. 2, Mar. 2008, pp. 199-206.

Iyer et al., "Framework for Post-Prognostic Decision Support", 2006 IEEE Aerospace Conference, Jul. 2006, pp. 1-10.

Final Office Action, dated Mar. 12, 2013, regarding USPTO U.S. Appl. No. 13/136,972, 20 pages.

USPTO final office action dated Feb. 29, 2012 regarding U.S. Appl. No. 12/638,015, 16 Pages.

USPTO non-final office action dated Mar. 28, 2011 regarding U.S. Appl. No. 12/638,015, 20 Pages.

USPTO non-final office action dated Sep. 6, 2011 regarding U.S. Appl. No. 12/638,015, 12 Pages.

(56) References Cited

OTHER PUBLICATIONS

USPTO final office action dated Mar. 28, 2011 regarding U.S. Appl. No. 12/368,024, 18 Pages.
USPTO non-final office action dated Dec. 16, 2011 regarding U.S. Appl. No. 12/368,024, 13 Pages.
USPTO non-final office action dated Dec. 2, 2011 regarding U.S. Appl. No. 12/368,047, 31 Pages.
USPTO final office action dated Apr. 20, 2012 regarding U.S. Appl. No. 12/577,549, 13 Pages.
USPTO non-final office action dated Dec. 1, 2011 regarding U.S. Appl. No. 12/577,549, 29 Pages.
Response to non-final office action dated Jan. 31, 2012 regarding U.S. Appl. No. 12/577,549, 12 Pages.
Amin et al., "Fuzzy Inference and Fusion for Health State Diagnosis of Hydraulic Pumps and Motors", Annual Meeting of the Fuzzy Information Processing Society, Jun. 2005, pp. 13-18.
Antolick et al., "Evaluation of Gear Condition Indicator Performance on Rotorcraft Fleet", RMCI, Inc., U.S. Army Aviation Engineering Directorate, Redstone Arsenal, AL, pp. 1-12.
Beshears et al., "Designing for Health: a Methodology for Integrated Diagnostics/Prognostics", 2005 IEEE Autotestcon, Sep. 2005, pp. 90-95.
Bhangu et al., "Nonlinear Observers for Predicting State-of-Charge and State-of-Health of Lead-Acid Batteries for Hybrid-Electric Vehicles", IEEE Transactions on Vehicular Technology, vol. 54, No. 3, May 2005, pp. 783-794.
Bi et al., "Neural Network Estimation of Low Airspeed for the V-22 Aircraft in Steady Flight", American Helicopter Society 59th Annual Forum, May 2003, pp. 1-11.
Bock et al., "On False Alarm Mitigation", 2006 IEEE Aerospace Conference, Jul. 2006, pp. 1-16.
Bock et al., "Ontogenetic Reasoning System for Autonomic Logistics", 2005 IEEE Aerospace Conference, Mar. 2005, pp. 3715-3722.
Bonissone, "Knowledge and Time: a Framework for Soft Computing Applications in Prognostics and Health Management (PHM)", GE Global Research Technical Information Series, 2007GRC372, Apr. 2007, pp. 1-9.
Bonissone, "Knowledge and Time: Selected Case Studies in Prognostics and Health Management (PHM)", GE Global Research Technical Information Series, 2007GRC426, May 2007, pp. 1-9.
Bonissone et al., "Soft Computing Applications to Prognostics and Health Management (PHM): Leveraging Field Data and Domain Knowledge", 2007, GE Global Research , pp. 1-12.
Bonissone et al., "When will it break? A Hybrid Soft Computing Model to Predict Time-to-break Margins in Paper Machines", Proceedings of SPIE 47th Annual Meeting, International Symposium on Optical Science and Technology, Applications and Science of Neural Networks, Fuzzy Systems, and Evolutionary Computation V, Jul. 2002, pp. 53-64.
Brotherton et al., "Generic Integrated PHM/Controller System", 2005 IEEE Aerospace Conference, Mar. 2005, pp. 3427-3437.
Brown et al., "Electronic Prognostics—A Case Study Using Switched-Mode Power Supplies (SMPS)", IEEE Instrumentation & Measurement Magazine, Boeing Worldwide, Aug. 2007, pp. 20-26.
Brown et al., "Electronic Prognotics—A Case Study Using global Positioning system (GPS)," 2005 IEEE Autotestcon, Sep. 2005, pp. 833-839.
Byington et al., "Dynamic Signal Analysis and Neural Network Modeling for Life Prediction of Flight Control Actuators", American Helicopter Society 60th Annual Forum, vol. 1, Jun. 2004, pp. 1-10.
Chinnam et al., "Online Reliability Estimation of Physical Systems Using Neural Networks and Wavelets", Smart Engineering system Design, vol. 4, Apr. 2002, pp. 253-264.
Clifton, "Condition Monitoring of Gas-Turbine Engines", Submitted to Department of Engineering Science, University of Oxford, St. Cross College, Dec. 2005, pp. 1-60.
Cuc, "Vibration-Based Techniques for Damage Detection and Health Monitoring of Mechanical Systems", Partial Requirements for the Degree of Master of Science, Department of Mechanical Engineering, College of Engineering & Information Technology, University of South Carolina, 2002, 127 pp.
Gebraeel et al., "Residual Life Predictions From Vibration-Based Degradation Signals: A Neural Network Approach", IEEE Transactions on Industrial Electronics, vol. 51, No. 3, Jun. 2004, pp. 694-700.
Gebraeel, "Sensory-Updated Residual Life Distributions for Components With Exponential Degradation Patterns", IEEE Transactions on Automation Science and Engineering, vol. 3, No. 4, Oct. 2006, pp. 382-393.
Ginart et al., "Self-Healing from a PHM Perspective", 2006 IEEE Autotestcon, Sep. 2006, pp. 697-703.
Goebel et al., "Fusing Competing Prediction Algorithms for Prognostics", 2006 IEEE Aerospace Conference, Jul. 2006, pp. 1-10.
Goebel, "Modeling Propagation of Gas Path Damage", 2007 IEEE Aerospace Conference, Mar. 2007, pp. 1-8.
Goebel et al., "Prognostic Fusion for Uncertainty Reduction", 2007 AIAA Infotech@Aerospace Conference and Exhibit, May 2007, pp. 1-10.
Goh et al., "A Review of Research in Manufacturing Prognostics", 2006 IEEE International Conference on Industrial Informatics, Aug. 2006, pp. 417-422.
Grana et al., "Increasing the Robustness of Heteroassociative Morphological Memories for Practical Applications", 2002 Proceedings of ISMM, 2002, pp. 379-388.
Hess et al., "Challenges, Issues and Lessons Learned Chasing the "Big P": Real Predictive Prognostics Part 1", 2005 IEEE Aerospace Conference, Mar. 2005, pp. 3610-3619.
"Saffron Enterprise," Saffron Technology, Inc., Oct. 2009 archive, 1 PAGE, accessed Jul. 23, 2012 http://www.saffrontech.com/saffron-enterprise.shtml (http://web.archive.org/web/20091025212451/http://www.saffrontech.com/saffron-enterprise.shtml).
"Text and Entity Analytics for Big Data," SRA International, Inc., 2012, 2 PAGES, accessed Jul. 23, 2012, http://www.sra.com/netowl/.
Kalgren et al., "Self-Evolving, Advanced Test Stand Reasoning for Closed Loop Diagnostics", IEEE Autotestcon 2005, Sep. 2005, pp. 495-501.
Katipamula et al., "Methods for Fault Detection, Diagnostics, and Prognostics for Building Systems—A Review, Part I", HVAC&R Research, vol. 11, No. 1, Jan. 2005, pp. 1-24.
Katipamula et al., "Methods for Fault Detection, Diagnostics, and Prognostics for Building Systems—A Review, Part II", HVAC&R Research, vol. 11, No. 2, Apr. 2005, pp. 1-19.
Khawaja et al., "Reasoning about Uncertainty in Prognosis: A Confidence prediction Neural Network Approach", Annual Meeting of the North American Fuzzy Information Processing Society, Jun. 2005, pp. 7-12.
Lavretsky et al., "Health Monitoring of an Electro-Hydraulic System Using Ordered Neural Networks", Proceedings of the 2002 International Joint Conference on Neural Networks, 2000, vol. 3, Aug. 2002, pp. 2893-2898.
Lee, "Measurement of machine performance degration using a neural network model", Elsevier Science Publishers, Computers in Industry, vol. 30, Iss. 3, Oct. 1996, pp. 193-209.
Luo et al., "Model-Based Fault Diagnosis Prognosis for Wheeled Mobile Robots: a Review", 31st Annual Conference of IEEE Industrial Electronics Society 2005, Nov. 2005, pp. 2267-2272.
Mackey et al., "BEAM: Technology for Autonomous Self-Analysis", IEEE Proceedings Aerospace Conference, vol. 6, Mar. 2001, pp. 2989-3001.
Muscettola et al., "Remote Agent: to boldly go where no AI system has gone before", Intelligence, vol. 103, Iss. 1-2, 1998, pp. 5-47.
Nanduri et al., "Circuit as a Sensor, a Practical Concept for Electronic Prognostics", 2007 IEEE Autotestcon, Sep. 2007, pp. 632-638.
NASA, Data Driven Prognostics Overview, 8 pp., accessed Dec. 13, 2011 http://ti.arc.nasa.gov/tech/dash/pcoe/data-driven-prognostics/.
NASA, Data Driven Prognostics References, 6 pp., accessed Dec. 13, 2011 http://ti.arc.nasa.gov/tech/dash/pcoe/data-driven-prognostics/bibliography/.

\* cited by examiner

PLATFORM HEALTH MONITORING SYSTEM

CROSS-REFERENCE TO RELATED APPLICATION

This application is a continuation-in-part of patent application U.S. Ser. No. 12/577,549, filed on Oct. 12, 2009, entitled "Platform Health Monitoring System", which is incorporated herein by reference.

BACKGROUND INFORMATION

1. Field

The present disclosure relates generally to platforms and, in particular, to a method and apparatus for monitoring platforms. Still more particularly, the present disclosure relates to a method and apparatus for monitoring the health and function of platform systems and subsystems.

2. Background

A platform may take the form of, for example, without limitation, a mobile platform, a stationary platform, a land-based structure, an aquatic-based structure, a space-based structure, an aircraft, a submarine, a bus, a personnel carrier, a tank, a train, an automobile, a spacecraft, a space station, a satellite, a surface ship, and/or some other suitable platform. The reliability of a platform is important to the operation and use of the platform.

For example, with aircraft, it is desirable to know when different components of the aircraft may need maintenance. The maintenance may be performed using maintenance schedules. With the scheduled maintenance, unscheduled interruptions in the use of the aircraft may be avoided. Even with the scheduled maintenance, components may require replacement or maintenance at times other than those indicated by schedules. As a result, an aircraft may be out of service at unplanned times. This situation may require having additional aircraft or delays in transporting passengers or cargo, or performing its mission.

Additionally, health monitoring systems are used to monitor various systems of a platform. Current health monitoring systems monitor components for indications that the component is not operating at a desired level of performance. The monitoring of a platform is performed by gathering information from these different components or sensors associated with the components and comparing their raw or processed output with a set threshold. This set threshold may be identified based on engineering analysis which disregards impact of other factors to the sensor raw data and the processed output. Currently available health monitoring systems receive and process large amounts of data from sensors for use in assessing the health of different systems and components in a platform.

Currently available health monitoring systems use limited sets of data from specific on-board sensors or sources to assess the health of a platform. For example, the health of a particular system may be derived from data collected from a particular set of sensors. Other available on-board and off-board data related to the health of the platform are not used in identifying the health of that system. Such data is not used currently due to complexity of physical correlation of the sensor data and inefficiency of processing large volumes of data with existing methods.

Currently available systems, however, may not provide an identification of the health of a vehicle with a desired amount of accuracy. When the accuracy does not meet desired levels, increased maintenance may occur. This increased maintenance may be due to missed, false, or late identification of inconsistencies in the vehicle. For example, if maintenance needed for a transmission system of a vehicle is not identified with the desired amount of accuracy, maintenance may not be performed on the correct component, resulting in unnecessary maintenance, increased maintenance cost, and reduced aircraft availability. As a result, additional parts, equipment, labor, and time may be needed to perform maintenance and obtain the desired performance from the transmission system.

Still further, data collected from the sensors can be influenced by maintenance actions that have taken place on a component. As a result of maintenance, changes in the output of the sensors incorrectly can appear to exceed set fault thresholds without actual part failure. Current health monitoring systems cannot distinguish between sensor output change due to maintenance on the vehicle or sensor output change due to the change in the part operational conditions.

Current health monitoring systems process only sensor data and do not take advantage on observations by crew and maintainers. For example, the crew can state that there was a smell of fumes around wirings. This piece of information for diagnosing an issue is not included in current sensor based diagnostics systems.

Therefore, it would be advantageous to have a method and apparatus that addresses one or more of the issues discussed above, as well as possibly other issues.

SUMMARY

The illustrative embodiments provide for a platform health monitoring system. The platform health monitoring system includes an associative memory comprising a plurality of data and a plurality of associations among the plurality of data. The plurality of data and their associations are collected into associated groups. The associative memory is configured to be queried based on at least indirect relationships among the plurality of data. The associative memory also stores a plurality of known health profiles for a platform. The platform health monitoring system also includes an input device in communication with the associative memory. The input device is configured to receive a current health profile of the platform. The platform health monitoring system also may include a comparator configured to compare, in conjunction with the associative memory, the current health profile with the plurality of known health profile to generate a comparison. The comparator is further configured to generate, based on the comparison and in conjunction with the associative memory, a report on a current health of the platform.

The illustrative embodiments also provide for a method. The method includes receiving in an associative memory a current health profile of a platform. The associative memory comprises a plurality of data and a plurality of associations among the plurality of data. The plurality of data and their associations are collected into associated groups. The associative memory is configured to be queried based on at least indirect relationships among the plurality of data. The associative memory also stores a plurality of known health profiles for a platform. The method also includes comparing, using a computer system in conjunction with the associative memory, the current health profile with the plurality of known health profiles to generate a comparison. The method also includes generating, based on the comparison and using the computer system in conjunction with the associative memory, a report on a current health of the platform.

The illustrative embodiments also include a system. The system includes an associative memory comprising a plurality of data and a plurality of associations among the plurality of data. The plurality of data and their associations are collected into associated groups. The associative memory is configured to be queried based on at least indirect relationships among the plurality of data. The associative memory also stores a plurality of known health profiles for a platform. The system includes an input device in communication with the associative memory. The input device is configured to receive sensor data relating to measurements taken by a sensor disposed on the platform. The input device is further configured to receive maintenance data relating to maintenance of the platform. The maintenance data is distinct from and unrelated to the sensor data. The system also includes a comparator configured to use both the sensor data and the maintenance data in conjunction with the associative memory to generate a report of a health of the platform.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
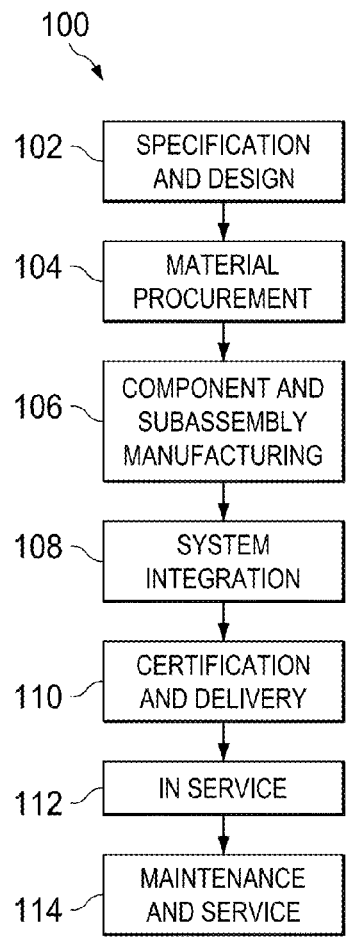
FIG. 1 is an illustration of a platform manufacturing and service method in accordance with an illustrative embodiment.
Figure 2:
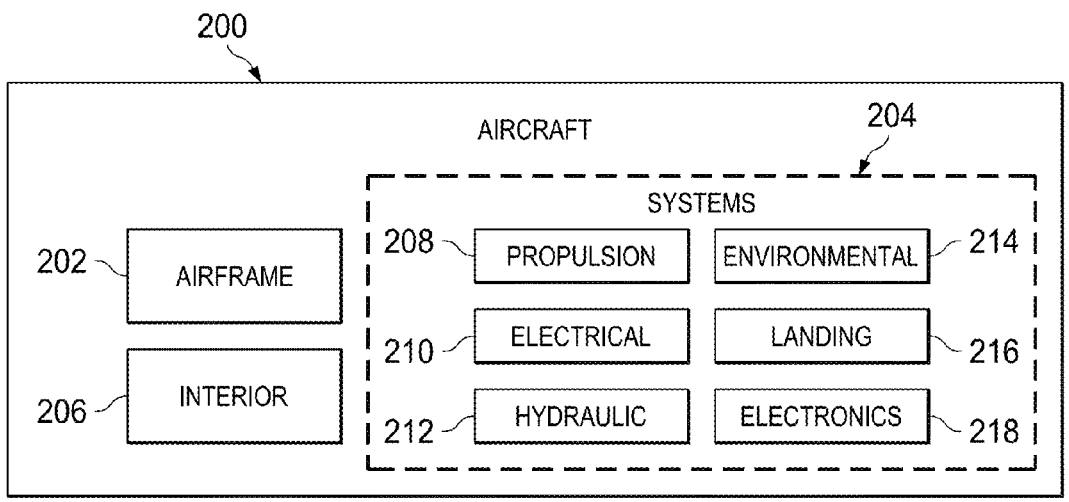
FIG. 2 is an illustration of an aircraft systems in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, environmental system 214, landing system 216, and electronics system 218. Any number of other systems may be included. Although an aerospace example is shown, different illustrative embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of and/or reduce the cost of aircraft 200.

As used herein, the term "associative memory" refers to a plurality of data and a plurality of associations among the plurality of data, which may be derived by associative memory entity analytics. The plurality of data and the plurality of associations may be collected in associated groups and stored in a non-transitory computer readable storage medium. The associative memory may be configured to be queried based on at least indirect relationships among the plurality of data in addition to direct correlations among the plurality of data. The associative memory may also be configured to be queried based on direct relationships, as well as combinations of direct and indirect relationships. Thus, an associative memory is not just storage; an associative memory includes the capability of computing similarities or associations among data elements.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. The software may be implemented by a hardware computer, or the hardware computer may be configured to carry out the process.

In these illustrative examples, a health monitoring system may be implemented in aircraft 200 during system integration 108 or maintenance and service 114 of FIG. 1. A health monitoring system, in accordance with an illustrative embodiment, may be used while in service 112 and/or during maintenance and service 114 in FIG. 1.

The different illustrative embodiments recognize and take into account a number of considerations. For example, the different illustrative embodiments recognize and take into account that in currently used health monitoring systems, the sensor data used to identify the condition of a component is often assigned by the designers of the health monitoring system.

The different illustrative embodiments recognize and take into account that this type of use of sensor data may not take into account other data that may affect a particular component. For example, changes or vibrations in a first system connected to a second system also may affect that second system. The different illustrative embodiments recognize and take into account that currently available health monitoring systems do not take into account all of the different systems or structures in the vehicle that may affect the system being monitored.

The different illustrative embodiments recognize and take into account that various types of analysis may be used to take into account additional data. For example, statistical analysis, data monitoring, signal processing, rule-based systems, fuzzy logic, genetic algorithms, Monte Carlo simulations, and/or other types of processes may be used. These different potential solutions, however, do not provide the desired results. With data monitoring, these types of processes are time consuming and costly in terms of software maintenance costs to update models, statistics, rules, fuzzy logic, genetic algorithms and simulation as well as being costly with respect to processor resources.

These different processes also may not provide the desired level of accuracy with respect to identifying the state of different systems within a platform. For example, with statistical analysis, assumptions are based on large numbers of samples that are often not available. Further, statistical analysis reduces the amount of information collected to a smaller set of parameters. With complex systems, the assumptions made for this type of analysis and the processing techniques used may not model the system with the amount of desired accuracy.

As another example, with signal processing, data is relied on from a number of sensors for a particular component. These values are compared with a threshold to make identifications. This type of technique does not take into account other types of conditions that may occur in the vehicle.

With rule-based systems, the different interactions between components in a vehicle may be difficult to identify and take into account.

Genetic algorithms may require more time than desired to obtain a proper configuration to identify the health of a vehicle. Monte Carlo simulations involve assumptions from random generators and statistics that may not be indicative of real world conditions.

The different illustrative embodiments recognize and take into account that a solution that takes into account sufficient data to more accurately identify the state of the vehicle is desirable. Thus, the different illustrative embodiments provide a method and apparatus for managing the health of a platform. In one illustrative embodiment, an apparatus comprises a computer system and a sensor network. The sensor network is associated with a platform. The computer system is connected to the sensor network and is configured to receive information from the sensor network. The computer system is configured to form observations from the information for a current profile. The computer system compares the current profile with a number of known profiles to identify a health state of the platform.

Figure 3:
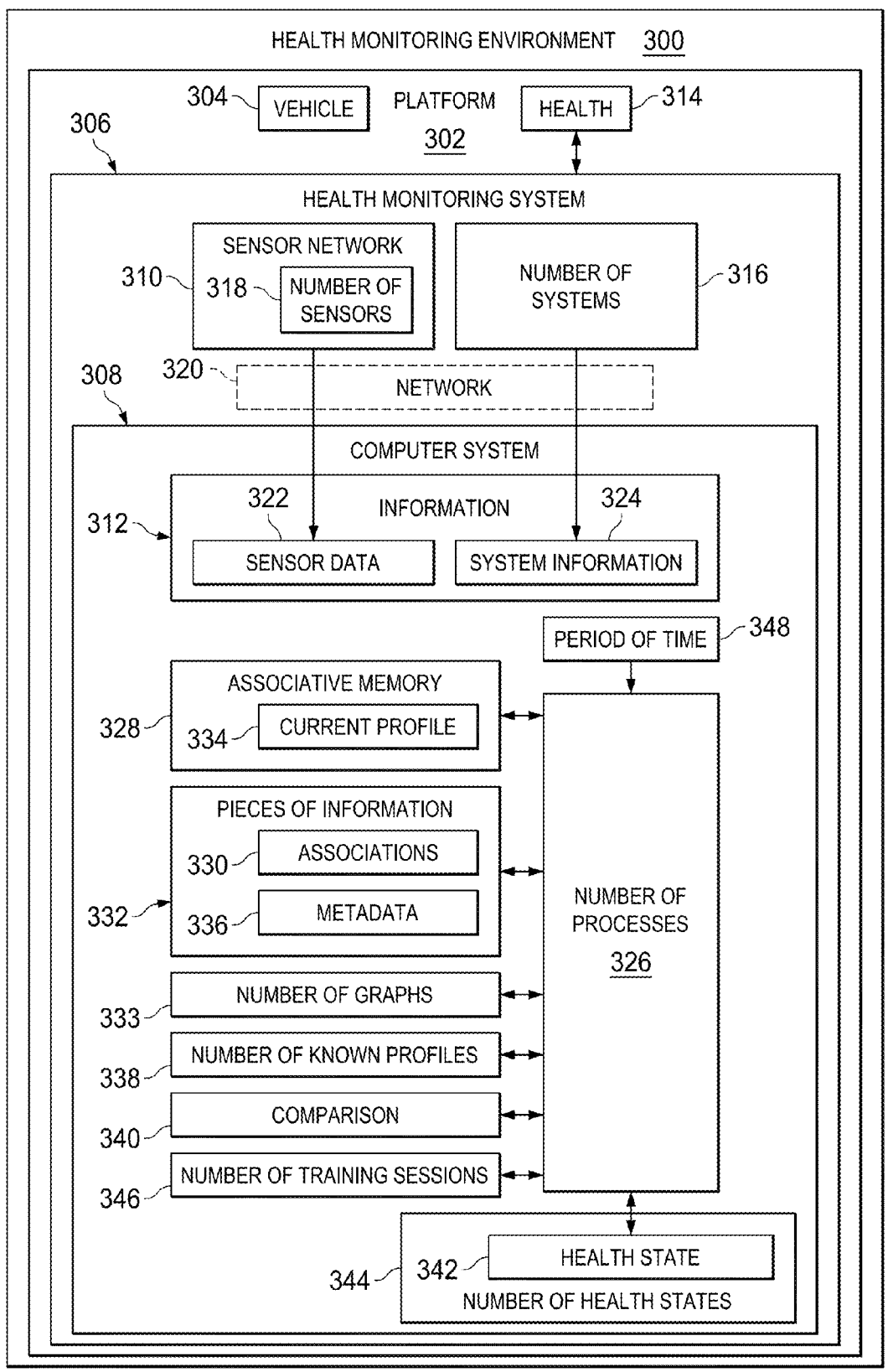
FIG. 3 is an illustration of a health monitoring environment using an associative memory in accordance with an illustrative embodiment.

With reference now to FIG. 3, an illustration of a health monitoring environment using an associative memory is depicted in accordance with an illustrative embodiment. Health monitoring environment 300 may be implemented using platform 302. As illustrated, platform 302 takes the form of vehicle 304. Vehicle 304 may be implemented using aircraft 200 in FIG. 2.

As illustrated, health monitoring system 306 is associated with platform 302. A first component may considered to be associated with a second component by being secured to the second component, bonded to the second component, fastened to the second component, and/or connected to the second component in some other suitable manner. The first component also may be connected to the second component through using a third component. The first component also may be considered to be associated with the second component by being formed as part of and/or as an extension of the second component.

In these examples, health monitoring system 306 is comprised of computer system 308 and sensor network 310. Computer system 308 may include one or more computers that may be in communication with each other. Computer system 308 is configured to perform a number of operations in these illustrative examples. Computer system 308 receives at least a portion of information 312 from sensor network 310 to monitor health 314 of platform 302. Information 312 also may be received from number of systems 316 associated with platform 302.

In these illustrative examples, sensor network 310 comprises number of sensors 318 connected to network 320. Network 320, in turn, is connected to computer system 308 in these examples. Number of sensors 318 generates sensor data 322 in information 312. A sensor within number of sensors 318 is a device that measures a physical quantity and converts that measurement into a signal. This signal may be an analog signal or a digital signal, depending on the particular implementation. This signal forms a part of sensor data 322.

Number of sensors 318 may comprise a number of different types of sensors. For example, without limitation, number of sensors 318 may comprise at least one of, an accelerometer, a strain gauge, a fiber optics sensor, a carbon dioxide sensor, a catalytic bead sensor, an oxygen sensor, a current sensor, a volt meter, an airflow sensor, a mask flow sensor, a hygrometer, a particle detector, an altimeter, a gyroscope, a microphone, a yaw rate sensor, and/or some other suitable type of device.

In some illustrative examples, "at least one of" may be, for example, without limitation, two of item A, one of item B, and ten of item C; four of item B and seven of item C; and/or other suitable combinations.

Number of systems 316 may include, for example, without limitation, computers, avionics, a propulsion system, an environmental system, a hydraulic system, a maintenance system, and/or other suitable types of systems. Number of systems 316 generates system information 324, which may be used by health monitoring system 306. In these illustrative examples, system information 324 may include data, commands, logs, messages, and/or other suitable types of information that may be generated by number of sensors 318 and number of systems 316.

In this illustrative example, computer system 308 runs number of processes 326 to process information 312 and identify association for placement into associative memory 328. Computer system 308 uses associative memory 328 to form current profile 334. For example, number of processes 326 may form associations 330 between pieces of information 332 to form number of graphs 333 and/or current profile 334. In these illustrative examples, current profile 334 is used to model a current health 314 of platform 302. Current profile 334 may change as information 312 received by computer system 308 changes. In this depicted example, current profile 334 is in associative memory 328.

Never before has the above-described associative memory 328 been applied to vehicle health monitoring. As defined above, associative memory 328 is more than just a stored collection of data. Associative memory 328 also derives and includes relationships, including direct relationships and indirect relationships, that may also be searched and/or compared. Thus, associative memory 328 is software or hardware, or both, that may be used to compare the underlying data and these relationships. Associative memory 328 allows for far greater capabilities than previous monitoring and reporting systems for vehicle health management.

For example, the illustrative embodiments, through use of associative memory 328, may take advantage of a diverse set of data from dedicated sensors, related systems, flight systems, reliability or maintainability analysis, and maintenance and operation management systems. Furthermore, associative memory 328 may analyze combinations of data having various formats, from numerical to textual to audio to visual. Associative memory 328 may analyze, or may be used to efficiently analyze, relationships among all these different types of data to produce an advanced vehicle health monitoring system that greatly improves on existing vehicle health monitoring systems.

For example, existing vehicle health monitoring systems are incapable of incorporating maintenance data related to a wing along with real time sensor data related to that wing to generate a health report that takes into account both forms of information. The illustrative embodiments can perform this type of assessment. In another example, current health monitoring systems cannot efficiently combine and process a large set of measured data without impacting the throughput of the system.

Furthermore, associative memory 328 may develop and store profiles that reflect various health conditions of a platform. For example, one memory profile can represent a healthy system, a second memory profile may represent the same system that may be inspected, and a third memory profile may represent the same system for which corrective action may be desirable. The illustrative embodiments may incorporate all of these profiles and analyze relationships among them, along with other data and their relationships, to generate a health maintenance report, either as a real time report or as a historical report. A real time report may be generated by comparing a current health profile for a vehicle based on real time sensor data to one or more known profiles already stored in associative memory 328.

In processing information 312, number of processes 326 may associate or add metadata 336 to pieces of information 332. Metadata 336 may be used to create associations 330 between pieces of information 332. In these illustrative examples, metadata 336 may be comprised of at least one of timestamps for pieces of information 332 and identifiers of sources of pieces of information 332.

Current profile 334 may then be compared to number of known profiles 338 to form comparison 340. Comparison 340 is used to identify health state 342 for platform 302. Health state 342 identifies health 314 for platform 302. Health state 342 may be selected from number of health states 344 for number of known profiles 338. In these illustrative examples, number of health states 344 may include, for example, without limitation, new, operational, healthy, degraded, needs repair, repaired, and/or other suitable states.

In these illustrative examples, number of known profiles 338 may be created through number of training sessions 346 using platform data 302. For example, in one training session in number of training sessions 346, all of information 312 received by health monitoring system 306 over period of time 348 may be identified as being for a particular health state within number of health states 344. For example, health state 342 may be "new" for period of time 348. Other profiles for number of known profiles 338 may be generated for other periods of time during number of training sessions 346.

The amount of information 312 collected may vary, depending on the particular implementation. For example, information 312 may be collected in a continuous manner, a uniform manner, a discontinuous manner, or a non-uniform manner. The information may be collected for a number of minutes, hours, days, or some other suitable period of time. Number of training sessions 346 may be performed for different known states of platform 302. Number of training sessions 346 may be performed specifically for platform 302 such that number of known profiles 338 accurately reflects different health states for platform 302.

In this manner, health monitoring system 306 may increase the availability of platform 302 as compared to currently used health monitoring systems. Comparison 340 of current profile 334 to number of known profiles 338 may be performed each time a piece of information is received by health monitoring system 306.

As yet another example, although platform 302 takes the form of vehicle 304 in these examples, platform 302 may take other forms. For example, platform 302 may be only a portion of vehicle 304. For example, platform 302 may be a propulsion system, a shaft, or some other part of vehicle 304.

The illustration of health monitoring environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, health monitoring system 306 may only receive information 312 from sensor network 310 and may not receive information 312 from number of systems 316. In yet other illustrative embodiments, multiple health monitoring systems may be present to monitor different portions of platform 302.

Figure 4:
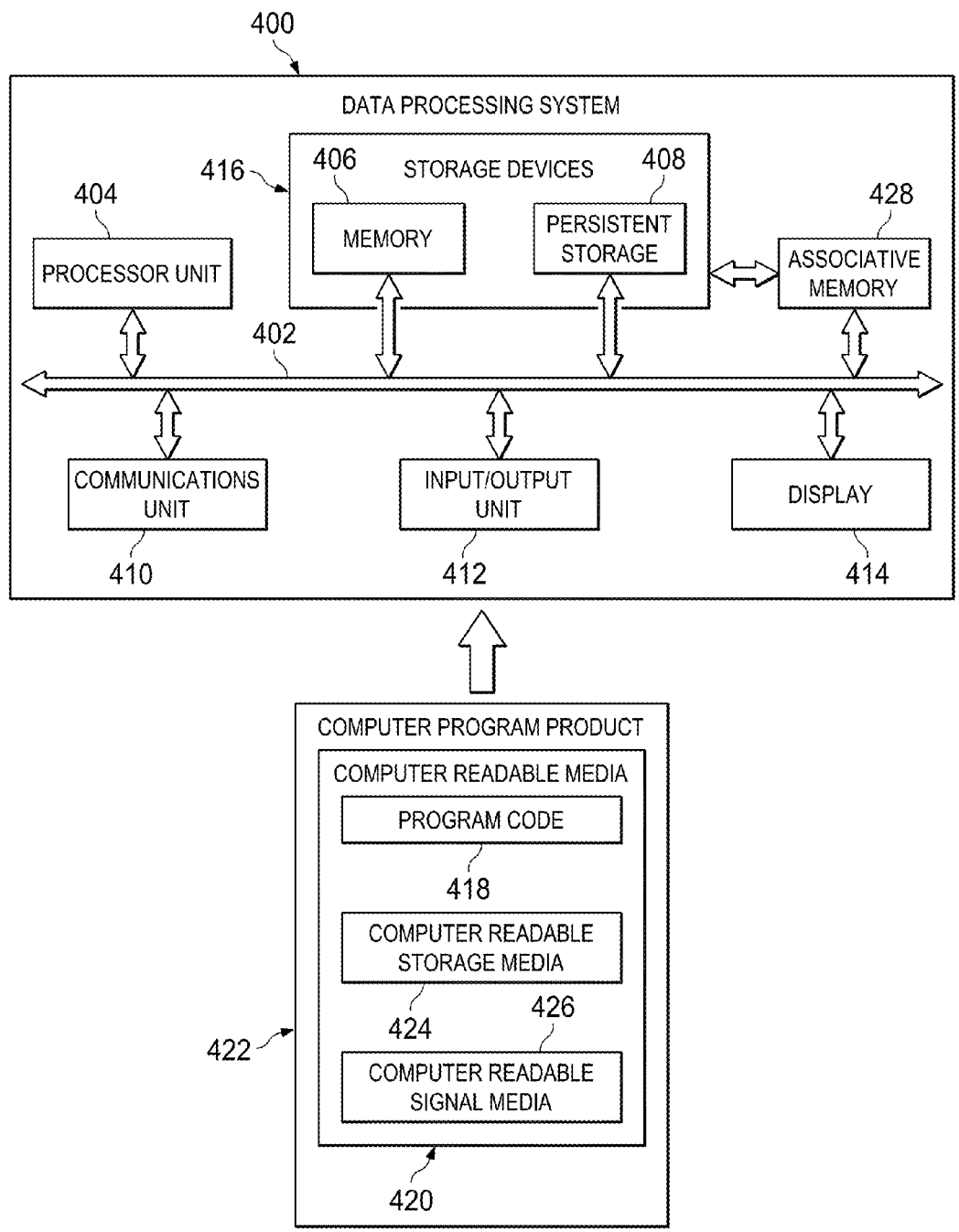
FIG. 4 is an illustration of a data processing system in accordance with an illustrative embodiment.

Turning now to FIG. 4, an illustration of a data processing system is depicted in accordance with an illustrative embodiment. Data processing system 400 in FIG. 4 is an example of a data processing system that may be used to implement the illustrative embodiments, such as system 300 of FIG. 1, or any other module or system or process disclosed herein. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output (I/O) unit 412 allows for input and output of data with other devices that may be connected to data processing system 400. For example, input/output (I/O) unit 412 may provide a connection for user input through a keyboard, a mouse, wireless transceiver, memory device, serial wired port (USB, Ethernet) and/or some other suitable input device. Further, input/output (I/O) unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Data processing system 400 may also include associative memory 428. Associative memory 428 may be associative memory 328 of FIG. 3 and may have the properties described elsewhere herein. Associative memory 428 may be in communication with communications fabric 402. Associative memory 428 may also be in communication with, or in some illustrative embodiments, be considered part of storage devices 416, or processor 404. While associative memory 428 is shown, additional associative memories may be present.

Figure 5:
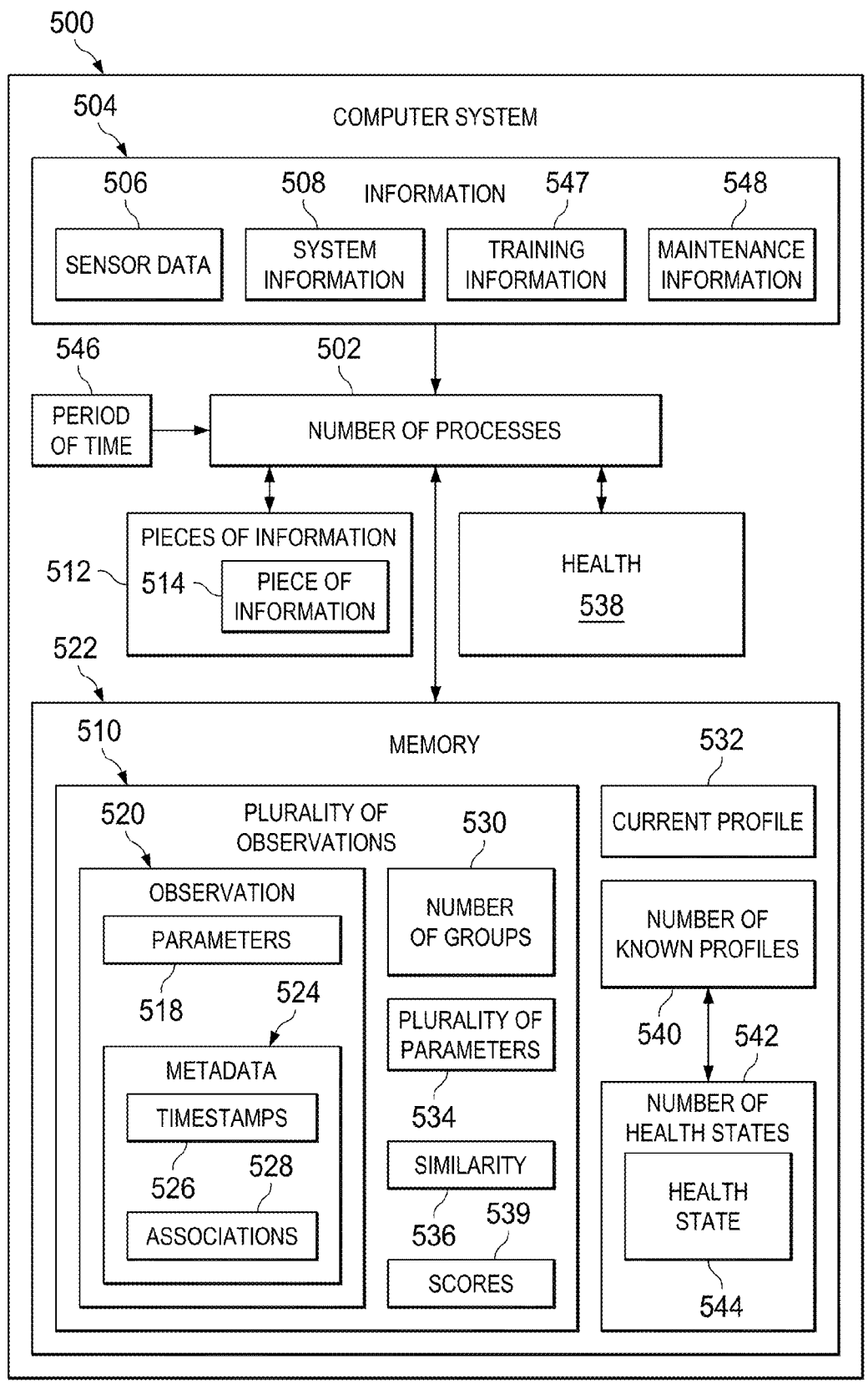
FIG. 5 is an illustration of a flow of information in a computer system for a health monitoring system in accordance with an illustrative embodiment.

Turning now to FIG. 5, an illustration of a flow of information in a computer system for a health monitoring system is depicted in accordance with an illustrative embodiment. In this illustrative example, computer system 500 may include one or more computers that may be implemented using data processing system 400 in FIG. 4.

In this illustrative example, number of processes 502 runs on computer system 500. Number of processes 502 receives information 504 in the form of at least one of sensor data 506 and system information 508. Number of processes 502 forms plurality of observations 510 using at least one of sensor data 506 and system information 508.

For example, number of processes 502 identifies pieces of information 512 within information 504. Piece of information 514 within pieces of information 512 may be identified based on when piece of information 514 was received. All information within piece of information 514 may be placed into parameters 518 for observation 520. Parameters 518 are variables filled with information from piece of information 514. Each parameter in parameters 518 may be a variable in which a value or text may be placed.

When parameters 518 are filled using piece of information 514, observation 520 in plurality of observations 510 is formed. Observation 520 is stored in plurality of observations 510 in memory 522.

Further, metadata 524 also may be included in observation 520. Metadata 524 may be, for example, without limitation, timestamps 526. In these illustrative examples, metadata 524 also may include associations 528. Associations 528 may be used to create associations between plurality of observations 510. Number of groups 530 is formed by plurality of observations 510 that are associated to each other based on similarities between plurality of observations 510. In these illustrative examples, when plurality of observations 510 are grouped into number of groups 530, current profile 532 is formed.

In these illustrative examples, plurality of observations 510 may be grouped into number of groups 530 based on a similarity of observations within plurality of observations 510 with each other. For example, parameters 518 in observation 520 may be compared with plurality of parameters 534 for other observations in plurality of observations 510. Based on this comparison, similarity 536 may be identified between observation 520 and other observations within plurality of observations 510. Scores 539 may be assigned to the other observations in plurality of observations 510.

Thereafter, scores 539 may be used to determine whether an association should be formed between observation 520 and each of the other observations in plurality of observations 510. This process may be performed for all of the other observations in plurality of observations 510.

Current profile 532 may be used to identify health 538 of a platform. For example, current profile 532 may be compared to number of known profiles 540. In these illustrative examples, each profile within number of known profiles 540 corresponds to number of health states 542 for the platform. A match with a profile in number of known profiles 540 or a closest match to a profile within number of known profiles 540 may be used to identify health state 544 within number of health states 542 for the platform. Health state 544 indicates health 538 of the platform.

Additionally, number of processes 502 may be run to create number of known profiles 540. For example, information 504 received during period of time 546 may be training information 547 for the platform during a particular health state. Number of processes 502 may be run for other periods of time to identify other known profiles.

Further, number of processes 502 may be run using a history of information 504 instead of during the collection of information 504 to create number of known profiles 540. Training information 547 may be identified using timestamps 526. Training information 547 is comprised of information previously collected. In some examples, timestamps 526 may be included in training information 547.

In addition, maintenance information 548 also may be used in creating number of known profiles 540. In some illustrative embodiments, maintenance information 548 may be a portion of training information 547. Maintenance information 548 may include information about a number of maintenance events. For example, maintenance information 548 may indicate when inspections occurred, new components are added, when repairs are made, when replacements are made, and/or other suitable information. This information may be used to identify an improperly installed part or an incorrect part.

Further, in some illustrative embodiments, computer system 500 selects a portion of plurality of observations 510 based on maintenance information 548. Computer system 500 selects the portion using the number of maintenance events and/or metadata. The metadata may comprise at least one of a timestamp for a piece of information and an identifier of a source of the piece of information. Current profile 532 may be created from the portion of plurality of observations 510 in these examples.

As a specific example, plurality of observations 510 may be formed based on information 504 for a landing system of an aircraft. Maintenance information 548 may indicate that a part of the landing system was replaced during the formation of plurality of observations 510. Maintenance information 548 and metadata 524 may be used to select the portion of plurality of observations 510 that was formed after the replacement of the part. The selected portion may then be used to create current profile 532.

The illustration of computer system 500 in FIG. 5 is not meant to imply physical or architectural limitations to the manner in which different illustrative embodiments may be implemented. For example, in some illustrative embodiments, number of known profiles 540 may be located in a remote location from computer system 500. As another example, one process in number of processes 502 may collect information 504 to form current profile 532. Another process may form associations 528 between plurality of observations 510 to form current profile 532.

Figure 6:
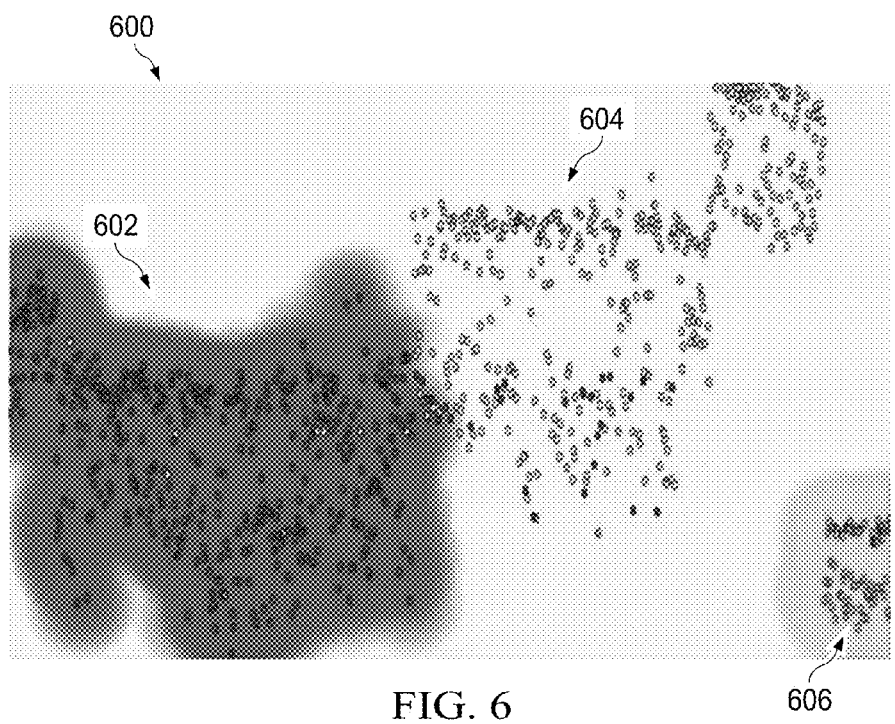
FIG. 6 is an illustration of a plurality of observations in accordance with an illustrative embodiment.

With reference now to FIG. 6, an illustration of a plurality of observations is depicted in accordance with an illustrative embodiment. Plurality of observations 600 is an example of one implementation of plurality of observations 510 in FIG. 5. Plurality of observations 600 comprise parameters for monitoring the health of a platform.

In this illustrative example, plurality of observations 600 may comprise observations that are formed based on information, such as information 504 in FIG. 5. As depicted, plurality of observations 600 are grouped into group 602, group 604, and group 606. Each of these groups comprises observations within plurality of observations 600 having a similarity.

Further, each of groups 602, 604, and 606 correspond to a health state. In this illustrative example, observations in group 602 correspond to a "degraded" health state. Observations in group 604 correspond to a "needs repair" health state. In some examples, the "needs repair" health state also may be referred to as a "faulty" health state. Observations in group 606 correspond to a "repaired" health state. In some examples, a "repaired" health state also may be referred to as a "healthy" state.

Figure 7:
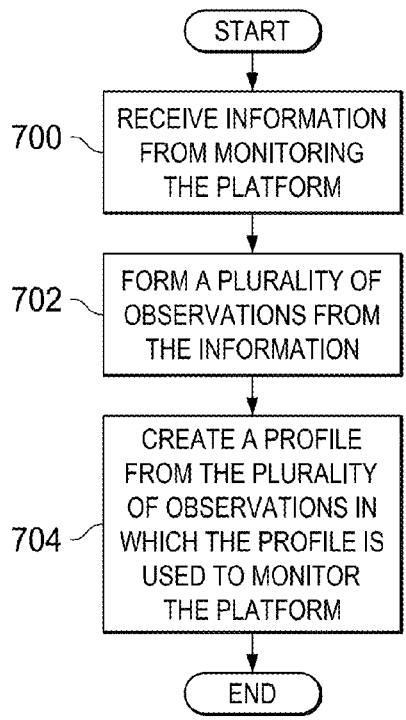
FIG. 7 is an illustration of a flowchart of a process for monitoring a platform in accordance with an illustrative embodiment.

With reference now to FIG. 7, an illustration of a flowchart of a process for monitoring a platform is depicted in accordance with an illustrative embodiment. The process in FIG. 7 may be implemented in health monitoring system 306 in health monitoring environment 300 in FIG. 3.

The process begins by receiving information from monitoring the platform (operation 700). The monitoring of the platform may be performed by receiving information from a sensor network associated with the platform. This monitoring also may occur by receiving information from a number of systems on the platform.

The process then forms a plurality of observations from the information (operation 702). These observations may be formed by identifying pieces of information in the information received. An observation is created from each piece of information to form the plurality of observations. In these illustrative examples, a piece of information may be identified as a piece of information at a particular time or within a particular period of time. The different values or text in the piece of information may be placed into parameters for an observation.

The process then creates a profile from the plurality of observations in which the profile is used to monitor the platform (operation 704), with the process terminating thereafter. The creation of the profile may be performed in a number of different ways. For example, the formation of the profile may occur by placing the plurality of observations in a memory. In other illustrative embodiments, the profile may be created when groupings of the plurality of observations are made.

The profile created in FIG. 7 may be a current profile when the information is collected during operation of the platform and analyzed to identify a health state for the profile. This health state may be used to indicate the health of the platform. In other illustrative embodiments, the profile may be a known profile that is created for use in monitoring a platform. When the profile is a known profile, the information also may include maintenance information.

Figure 8:
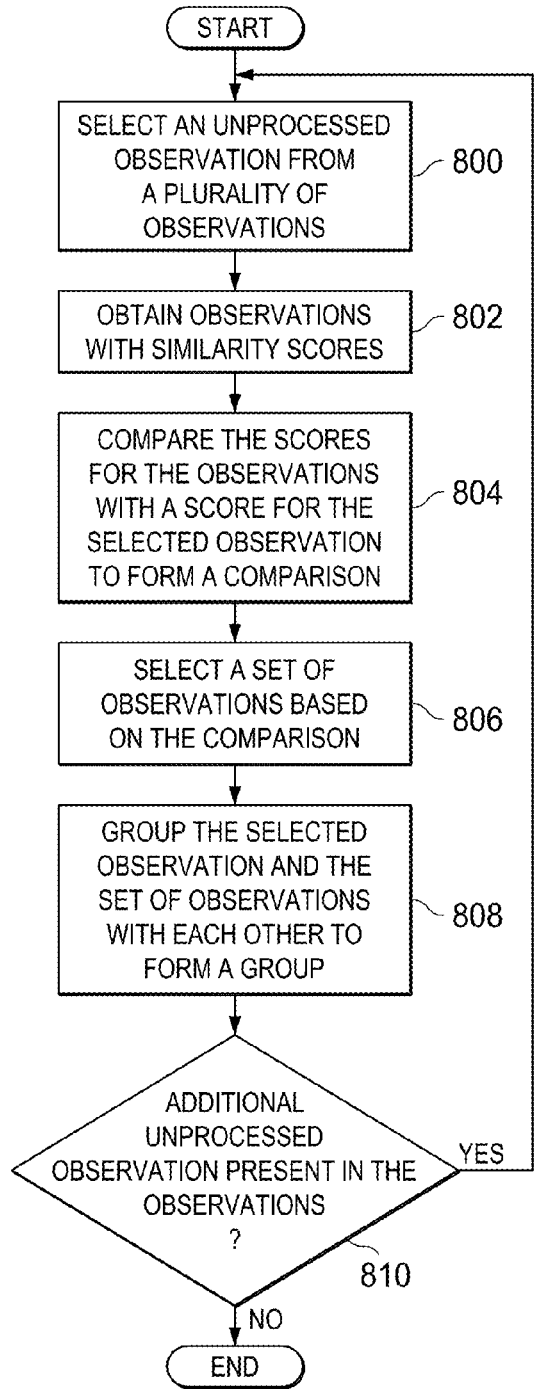
FIG. 8 is an illustration of a flowchart for creating a profile in accordance with an illustrative embodiment.

With reference now to FIG. 8, an illustration of a flowchart for creating a profile is depicted in accordance with an illustrative embodiment. The process illustrated in FIG. 8 may be implemented in number of processes 326 in FIG. 3 or number of processes 502 in FIG. 5.

The process begins by selecting an unprocessed observation from a plurality of observations (operation 800). The process then obtains observations with similarity scores (operation 802). In operation 802, these observations are observations other than the selected observation. In this illustrative example, these scores identify a similarity of the observations to the selected observation.

The process then compares the scores for the observations with a score for the selected observation to form a comparison (operation 804). A set of observations is selected based on the comparison (operation 806). In these illustrative examples, the set of observations may contain no observations, one observation, or any other number of observations from the observations from which the comparison was made. Next, the selected observation and the set of observations are grouped with each other to form a group (operation 808).

A determination is made as to whether an additional unprocessed observation is present in the observations (operation 810). If an additional unprocessed observation is present, the process returns to operation 800 as described above. Otherwise, the process terminates once processing of the observations is completed and the profile has been formed.

Figure 9:
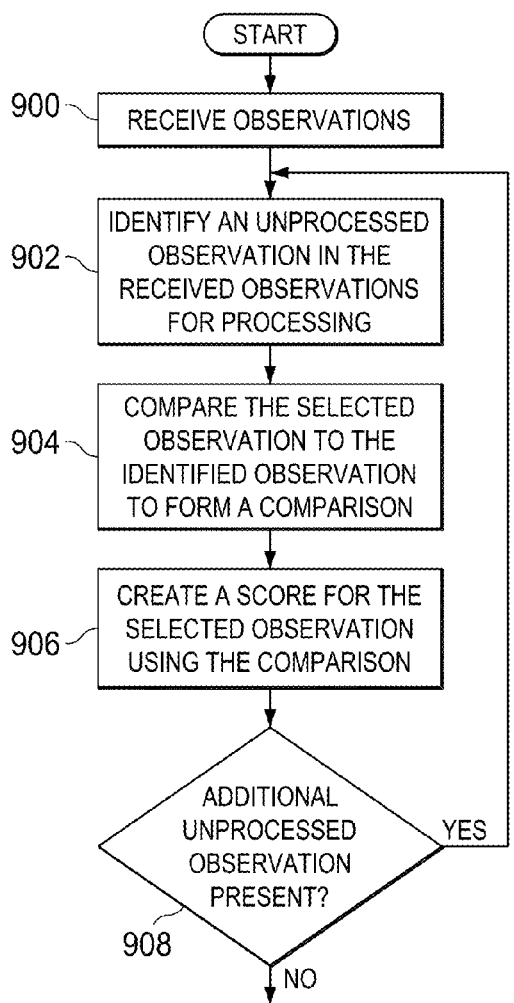
FIG. 9 is an illustration of a flowchart for creating scores for observations in accordance with an illustrative embodiment.

With reference now to FIG. 9, an illustration of a flowchart for creating scores for observations is depicted in accordance with an illustrative embodiment. The process illustrated in FIG. 9 is an example of one implementation of operation 802 in FIG. 8.

The process begins by receiving observations (operation 900). These observations are observations for which scores are desired with respect to a selected observation from which a similarity score is desired. The selected observation may be an unprocessed observation selected in operation 800 in FIG. 8. The process identifies an unprocessed observation in the received observations for processing (operation 902). The selected observation is compared to the identified observation to form a comparison (operation 904).

A score is created for the selected observation using the comparison (operation 906). A determination is made as to whether an additional unprocessed observation is present in the received observations (operation 908). If an additional unprocessed observation is present, the process returns to operation 902. Otherwise, the process terminates.

Figure 10:
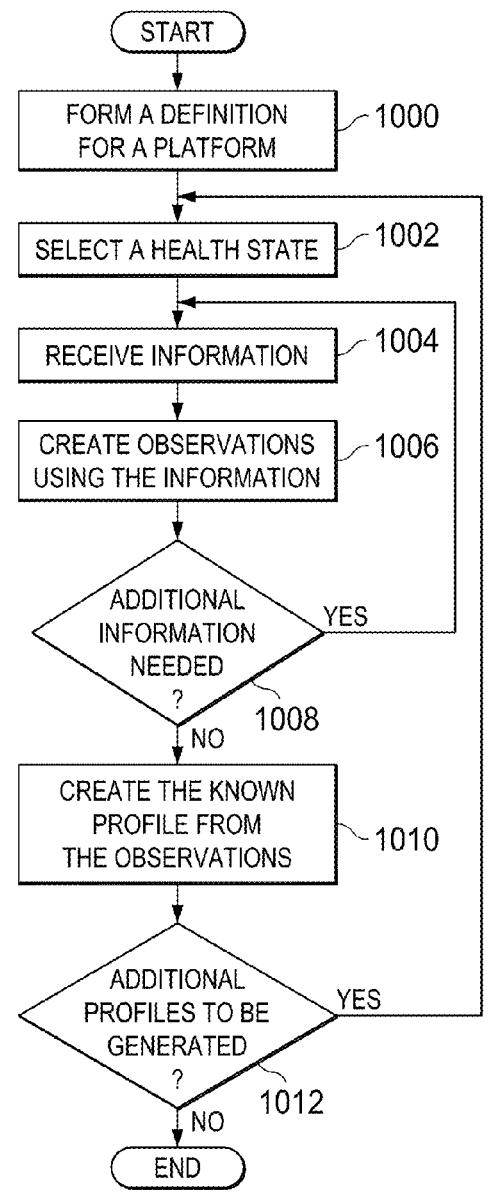
FIG. 10 is an illustration of a flowchart of a process for creating known profiles in accordance with an illustrative embodiment.

Turning now to FIG. 10, an illustration of a flowchart of a process for creating known profiles is depicted in accordance with an illustrative embodiment. The process illustrated in FIG. 10 may be implemented in health monitoring environment 300 in FIG. 3. Further, the process may be implemented within number of processes 326 in FIG. 3.

The process begins by forming a definition for a platform (operation 1000). This platform may be an entire vehicle, a subsystem, a component, or some other suitable portion of a platform. The definition for the platform includes parameters for observations.

The process then selects a health state (operation 1002). This health state is for the known profile that is to be generated. The process then receives information (operation 1004). In these examples, operation 1004 may be performed during operation of the platform. In some illustrative embodiments, the information may be a history of information previously collected for the platform. The process then creates observations using the information (operation 1006).

A determination is then made as to whether additional information is needed (operation 1008). If additional information is needed, the process returns to operation 1004. Otherwise, the process creates the known profile from the observations (operation 1010). A determination is then made as to whether additional profiles are to be generated (operation 1012). If additional profiles are to be generated, the process returns to operation 1002. Otherwise, the process terminates.

Figure 11:
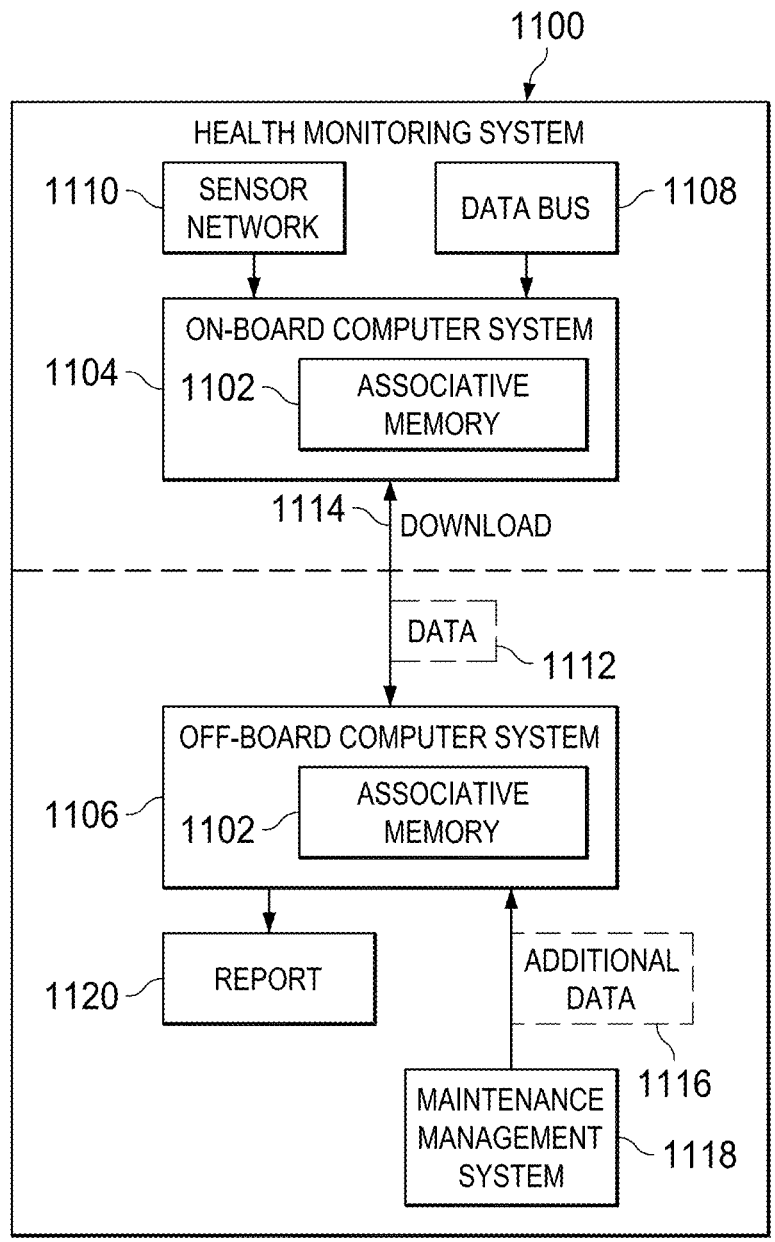
FIG. 11 is a block diagram of a health monitoring system in accordance with an illustrative embodiment.

FIG. 11 is a block diagram of a health monitoring system in accordance with an illustrative embodiment. Health monitoring system 1100 may be an example of another illustrative embodiment of health monitoring system 306 of FIG. 3. Associative memory 1102 may be associative memory 328 of FIG. 3, and as defined above. Health monitoring system 1100 is shown as a combined on-board computer system 1104 and off-board computer system 1106. However, in different illustrative embodiments health monitoring system 1100 may be either entirely on-board or off-board. Additionally, different components may be either on-board or off-board relative to the configuration shown in FIG. 11. As used herein, the term "on-board" means the system is carried entirely on a vehicle and the term "off-board" means the system is carried entirely off of a vehicle. In an illustrative embodiment, the vehicle is an aircraft.

In an illustrative embodiment, health monitoring system 1100 includes on-board computer system 1104 and data bus 1108 for recording directly or indirectly and/or processing information from sensor network 1110. Sensor network 1110 may be one or more sensors that sense various aspects of the vehicle. For example, one sensor may sense force applied to a wing, another sensor may sense deflection of a wing relative to an axis of the vehicle, another sensor may measure temperature outside the vehicle and/or inside the vehicle, another sensor may measure vibration of vehicle as a whole or of parts of the vehicle, and other parameters. This list of parameters is exemplary only. Thus, sensor network 1110 may include sensors that sense other types of parameters.

On-board computer system 1104 may either record and store data from sensor network 1110, or may transmit such data in real time or in bursts of data at different times. In any case, in this illustrative embodiment, data 1112 from on-board computer system 1104 is downloaded via transmission link 1114 to off-board computer system 1106. Data 1112 may be either pushed or pulled, and the term "download" as used herein includes both types of data transmission.

As shown, off-board computer system 1106 includes associative memory 1102. Associative memory 1102 may be included, in some illustrative embodiments, in on board computer system 1104. In other illustrative embodiments, associative memory 1102 may be present on both on-board computer system 1104 and off-board computer system 1106. In the latter example, associative memory 1102 might actually be two different associative memories. In any case, associative memory 1102 may be used to perform, or may itself perform, comparison and analysis of data 1112 and their relations in order to generate report 1120, which may be a report on the health of the vehicle. This process is further described with respect to FIG. 3 and as described elsewhere herein.

The report generated may include information outside of data 1112. For example, additional data 1116 from maintenance and management system 1118 may also be entered into associative memory 1102 and then considered together with data 1112 in producing report 1120. The resulting comparison is more valuable than use of a simple database to generate report 1120, because associative memory 1102 may be used, or may itself find, relationships among data 1112 and additional data 1116.

These relationships may identify hidden or difficult to identify issues with respect to the health of the vehicle. This capability may be illustrated by example. A history of maintenance of a fuselage of an aircraft may indicate a predilection for a certain type of inconsistency in a particular aircraft. Data from the sensor network may change subtly before the inconsistency arises. As used in this example, "subtly" means that the aircraft still functions within normal parameters and that the aircraft would pass a maintenance inspection if solely the data from the sensor network were analyzed. However, when comparing the maintenance data with the sensor network data, the relationship between the subtle change in data and the maintenance record may indicate that the particular aircraft may desirably be maintenanced before an inconsistency arises. Thus, the report on the particular aircraft's health may include this fact, a fact that simply could not be reported had only sensor data or maintenance data been considered alone. Use of associative memory 1102 provides for this capability, which cannot be provided by existing vehicle health monitoring systems.

In another example, performing maintenance, on or replacement of a part of a vehicle, may cause sensor network 1110 to report data 1112 indicating an inconsistency or undesirable performance. Pre-existing health monitoring systems would therefore report a fault. However, the illustrative embodiments shown in FIG. 3 and FIG. 11 can use associative memory 1102 to combine additional data 1116 from maintenance and management system 1118, and thereby correctly indicate in report 1120 that the vehicle part is healthy. Thus, the illustrative embodiments may be used to avoid false positives of fault reports that may occur in pre-existing vehicle health monitoring systems.

In yet another example, a crew member could log a report of an observation an inconsistency, which is stored as part of additional data 1116. This observation may not be sensed, or even be observable, by sensor network 1110. However, when data 1112 and additional data 1116 are combined by associative memory 1102, health monitoring system 1100 can accurately provide in report 1120 that maintenance of the appropriate part of the vehicle desirably may be performed. Thus, the illustrative embodiments may be used to avoid false negatives of fault reports that may occur in pre-existing vehicle health monitoring systems.

The above two examples illustrate how the associative memory may be configured to receive and process information about human observations and actions, along with sensor data on the vehicle itself. The health monitoring systems described herein also have other advantages over pre-existing health monitoring systems. For example, the associative memory may be trained by setting up known profiles based on ground data about the health status of the system and related sensor and human entries. In another example, the associative memory may assess the health status of the vehicle by identifying the similarity between a current profile to one or more known profiles. In still another example, the associative memory may assign a health status based on a maximum similarity to a particular pre-existing profile.

While the above examples relate to vehicles, the illustrative embodiments are not limited to vehicles. As described elsewhere herein, the term "vehicle" could be replaced by the term "platform" which may include many different objects, including buildings and many different types of vehicles.

Figure 12:
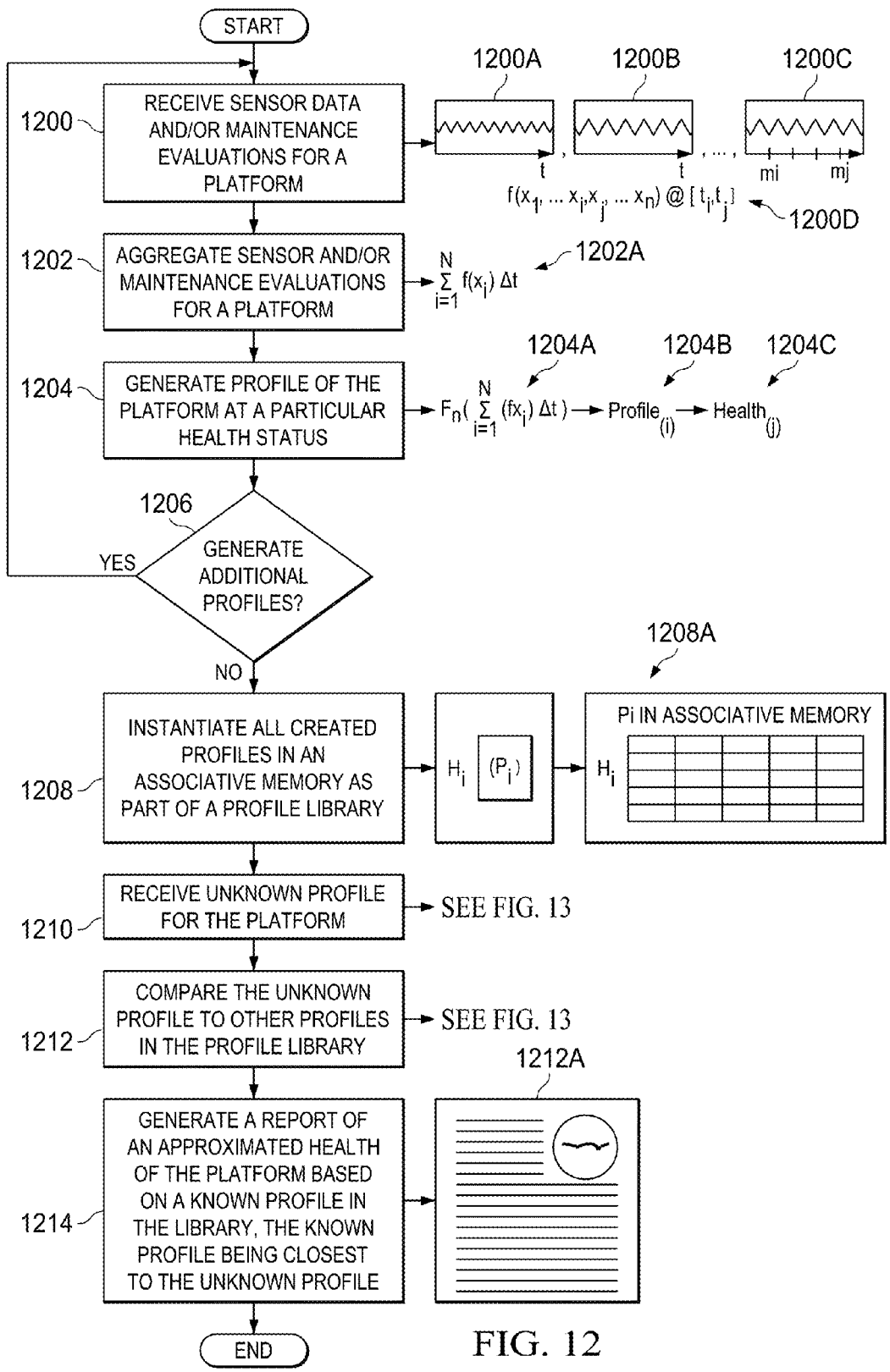
FIG. 12 is a flowchart of a process for monitoring a platform, in accordance with an illustrative embodiment.

FIG. 12 is a flowchart of a process for monitoring a platform, in accordance with an illustrative embodiment. The process shown in FIG. 12 may be implemented using health monitoring environment 300 of FIG. 3, health monitoring system 1100 of FIG. 11, or health monitoring environment 1500 of FIG. 15. The process shown in FIG. 12 may be a variation of the process shown in FIG. 7 through FIG. 10, or FIG. 16. The process shown in FIG. 12 may be implemented using an associative memory, such as associative memory 428 of FIG. 4. The process shown in FIG. 12 may also be implemented using one or more processors, such as processor unit 404 in FIG. 4, possibly operating in conjunction with an associative memory. Although the operations presented in FIG. 12 are described as being performed by "a process," the operations are being performed by at least one tangible processor or using one or more physical devices, as described elsewhere herein. In an illustrative embodiment, the "process" may be an associative memory performing all of the operations shown in FIG. 12. Horizontal arrows in FIG. 12 refer to explanatory material for a corresponding operation, and are not part of the flow of operations.

The method begins as the process receives sensor data and/or maintenance evaluations for a platform (operation 1200). For example, the process may receive one or more sensor data, such as sensor data over time 1200A from a first sensor and sensor data over time 1200B from a second sensor. In an illustrative embodiment, maintenance data over time 1200C may also be received. These data may be expressed as functions, such as function 1200D.

Thus, in an illustrative embodiment, the received sensor information may be samples from multiple variables $X(1), \ldots, X(i), \ldots, X(n)$. In addition, maintenance actions may be expressed as $MX(1), \ldots, MX(i), \ldots, MX(n)$. These variables may be related by time, t or some other dependent or independent variable creating a state space trajectory over the independent variable. The state space trajectory sometimes can be expressed as a set of functions $f(X(1), t(1)) \ldots, f(X(i), t(i)), \ldots f(X(n), t(n))$ and separately or in combination with the maintenance action variables $f(MX(1), t(1)) \ldots, f(MX(i), t(i)), \ldots f(MX(n), t(n))$.

After receiving sensor and/or maintenance evaluations, the process may aggregate sensor and/or maintenance evaluations for the platform (operation 1202). This process of aggregation may be represented mathematically by summation statement 1202A. Thus, in an illustrative embodiment, an aggregate of state space trajectories may be expressed as $\Sigma f(X(i), t(i))$ $i=1 \ldots N$ and this expression of aggregated sensor data may be accompanied by $\Sigma f(MX(i), t(i))$ $i=1 \ldots N$, representing aggregated maintenance data.

After aggregating sensor and/or maintenance evaluations, the process may generate a profile of the platform at a particular health status (operation 1204). This profile may be expressed mathematically as a function, such as function 1204A. The profile may be a profile of the platform at a particular time, and thus is one of many profiles for the platform, and may be expressed as Profile(i), as shown at expression 1204B. This profile may be associated with a particular evaluated health of the platform, and may be expressed as "Health (j)" as shown at expression 1204C.

Thus, in a functional form, a profile may also be expressed as a function $Fn(\Sigma f(X(i), t(i)) X \Sigma f(MX(i), t(i))) \rightarrow Profile(i)$. The term "X" in this expression represents the functional cross products between the sensor state space trajectories and the maintenance actions state space trajectories. In turn the function $Fn(\Sigma f(X(i), t(i)) X \Sigma f(MX(i), t(i))) \rightarrow Profile(i)$ is in a one-to-one symmetric functional relationship with $\leftarrow \rightarrow$ Health Assessment(i).

Optionally, after generation of a profile at operation 1204, the process may determine whether additional profiles are to be generated (operation 1206). If other profiles are to be generated, then the process returns to operation 1200. If other profiles are not to be generated, then the process continues. In some illustrative embodiments, generation of additional profiles may have already been performed and are already available for instantiation in the associative memory. Likewise, additional profiles may already be instantiated in the associative memory for later use, such as at later operations 1210, 1212, and 1214.

Assuming no further profiles are to be generated, the process instantiates all created profiles in an associative memory as part of a profile library (operation 1208). In some cases, the profile library may be considered complete prior to initiation of the method, in which case all of operations 1200 through 1208 may be considered optional.

As illustrated by expression 1208A, the multiple Health Assessment $H(i) \leftarrow \rightarrow Profile(i)$ as specified by the function $Fn(\Sigma f(X(i), t(i)) X \Sigma f(MX(i), t(i)))$ (expression 1) may be instantiated in an associative memory. The instantiated health assessment, or profile, in the associative memory may contain the correlates of all sensor state space trajectories and maintenance state space trajectories that correspond to all known observations, both of sensors on the platform as well as by human maintenance personnel, as well possibly as by other sensors and observations.

Referring again to expression 1208A and expression 1, above, given a particular observation that exists within the associative memory instance; a particular observation's correlated larger context associates that particular observation with a particular health assessment profile, Health Assessment(i)←→Profile(i). An associative memory infrastructure may contain a similarity scoring mechanism either as an embedded function or externally provided function. The similarity scoring function may give a similarity score S(H(I)∥P(I))=1.0 I=1 . . . N profile if the given observation is an observation from the Ith profile state space trajectory. This similarity score may be used when comparing an unknown profile to a known profile, as described later in operation 1212.

When the profile library of the associative memory is deemed complete, or at least is ready for use, the process may receive an unknown profile for the platform (operation 1210). This unknown profile may be a new profile generated according to the procedures described above with respect to operations 1200 through 1208. This unknown profile may represent a new set of sensor measurements, maintenance observations, and/or other observations for the platform. A user may wish to determine how this unknown profile compares to existing profiles in order to evaluate a health of the platform. Thus, the process may be invoked to compare the unknown profile to other profiles in the profile library (operation 1212). Additional detail regarding these two operations, operation 1210 and operation 1212, is provided in FIG. 13.

In summary however, the process may compare the unknown profile to known profiles in order to determine which of the known profiles best matches the unknown profile, based on the similarity score described above. The current health of the platform may then be approximated as the known health of the platform at the known profile.

Thus, after comparing the unknown profile to other profiles in the profile library, the process may generate a report of an approximated health of the platform based on a known profile in the library, the known profile being closest to the unknown profile (operation 1214). This report may include text and/or figures, or even audio data, or other types of data, as graphically represented by report 1212A. The process may terminate thereafter.

Figure 13:
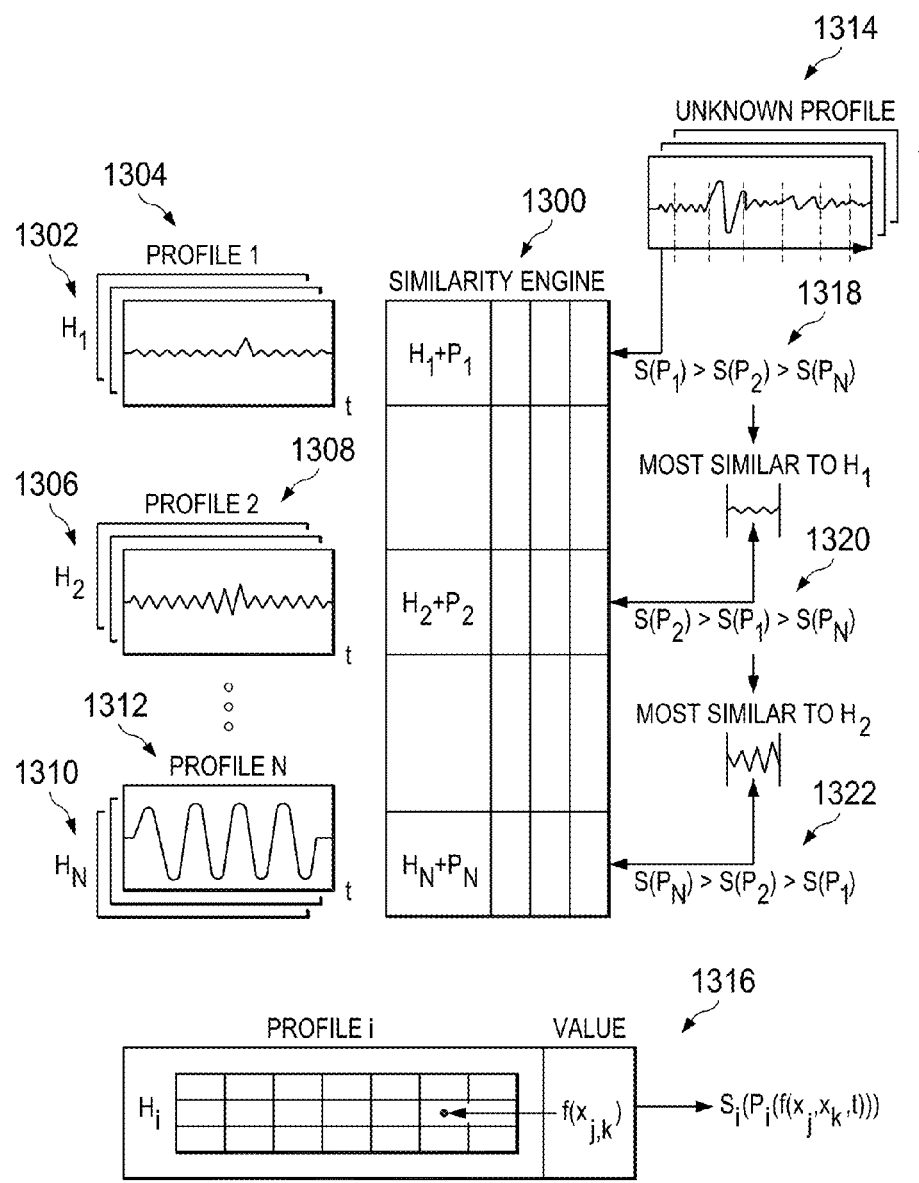
FIG. 13 is a block diagram illustrating use of similarity engine, in accordance with an illustrative embodiment.

FIG. 13 is a block diagram illustrating use of similarity engine, in accordance with an illustrative embodiment. Similarity engine 1300 may be embodied in an associative memory, and/or may be implemented either by an associative memory or by a processor, possibly operating in conjunction with an associative memory. An example of an associative memory is associative memory 428 of FIG. 4 and an example of a process is processor unit 404 of FIG. 4. Use of similarity engine 1300 may be part of operations 1210 and 1212 of FIG. 12. Similarity engine 1300 may also be used in other environments, such as health monitoring environment 300 of FIG. 3, health monitoring system 1100 of FIG. 11, or health monitoring environment 1500 of FIG. 15.

Similarity engine 1300 may take as input a plurality of health assessments and profiles stored in an associative memory, such as those described with respect to FIG. 12, above. Thus, for example, FIG. 13 shows health assessment 1 ($H_1$) 1302 with associated profile 1 1304 at time t, health assessment 2 ($H_2$) 1306 with associated profile 2 1308 at time t, with multiple additional health assessments and profiles provided through health assessment N ($H_N$) 1310 with associated profile N 1312 at time t. Although the variable of "t" is used in each case, the actual value of "t" may vary from assessment to assessment and profile to profile. In other embodiments the variable "t", denoting time, may be expressed in relative delta times from one event to another and not necessarily as absolute times.

As used herein the term "profile" or "health profile" both may refer to multiple sets of data, one set for each source, and may further include correlations among the data. A source of data may be, for example, data output by a sensor on the platform. A source of data may be, for example, an observation by human maintenance personnel or a pilot. A source of data could be from many different objects or persons. Combined, the different sets of data may form a profile. In some cases, a profile may contain correlations among the data or other relationships among the data, such as additional data that indicates similarities among the data. Correlations or similarities may be among individual data, may be among different sets of data, or combinations thereof. Such correlations may be generated by an associative memory as part of constructing a profile. Information, including correlations among data, may be added to a profile after initial creation of the profile.

These health assessments and profiles may be instantiated in the associative memory, which may then access them as part of executing a query or a request to perform a comparison using similarity engine 1300. For example, unknown profile 1314 may be received. Unknown profile 1314 also may be instantiated in the associative memory. The associative memory may then receive a query to compare unknown profile 1314 to one or more, possibly all, of the known health assessments and profiles already stored in the associative memory. The goal of the query is to determine a health assessment that should be assigned to unknown profile 1314.

The associative memory may then generate similarity scores for one or more, possibly all, of the known profiles relative to unknown profile 1314. This similarity score may be expressed as S(Pi), where "i" corresponds to a particular profile in question. This comparison process is also described more broadly with respect to FIG. 9 and FIG. 12.

More fully, the similarity score may be expressed as $S_i(P_i (f(x_j, x_k, t))$, as shown at relation 1316. Thus, for Health Assessment "i" ($H_i$) and Profile "i" ($Profile_i$), having values of $f(x_{j,k})$, a comparison to unknown profile 1314 may generate similarity score $S_i$.

Stated differently, the associative memory may be queried with an observation from unknown profile 1314, O(P(unknown)). As a result of comparing the unknown profile to known profiles, a similarity score, S(P(unknown)) is generated. This similarity score, S(P(unknown)) indicates the nearest health profile (I) and observations from known profiles where S(H(I)|P(I))>S(P(unknown))>S(H(j)|P(J) for all J<>I.

Specific examples of this procedure are shown in FIG. 13. If $S(P_1)>S(P_2)>S(P_N)$ (expression 1318), then unknown profile 1314 is most similar to health profile $H_1$ 1302. As a result, unknown profile 1314 is assigned the value of $H_1$ 1302. In other words, the current health state of the platform is now considered to be the known health state of $H_1$ 1302. If $H_1$ 1302 were, for example, "healthy", then the user could evaluate unknown profile 1314 as representing a healthy platform.

On the other hand, if $S(P_2)>S(P_1)>S(P_N)$ (expression 1320), then unknown profile 1314 is most similar to $H_2$ 1306. If $H_2$ 1306 were, for example, "degraded," then the user could evaluate unknown profile 1314 as representing a degraded platform that might desirably be maintenanced. Likewise, if $S(P_N)>S(P_2)>S(P_1)$ (expression 1322), then unknown profile 1314 is most similar to $H_N$ 1310. The corresponding health state of $H_N$ 1310 would then be assigned to unknown profile 1314.

Although FIG. 13 illustrates one mechanism for evaluating the current health of a platform based on unknown profile 1314 received for that platform, other techniques may also be used. For example, a similarity score might not be generated. Instead, similarity engine 1300 may use a direct comparison of profiles, identify the best match, and assign a health assessment to the unknown profile accordingly. In another variation, unknown profile 1314 may be synthesized or summarized and compared to synthesized known profiles. Other techniques may also be used to assign a health assessment to unknown profile 1314.

Figure 14:
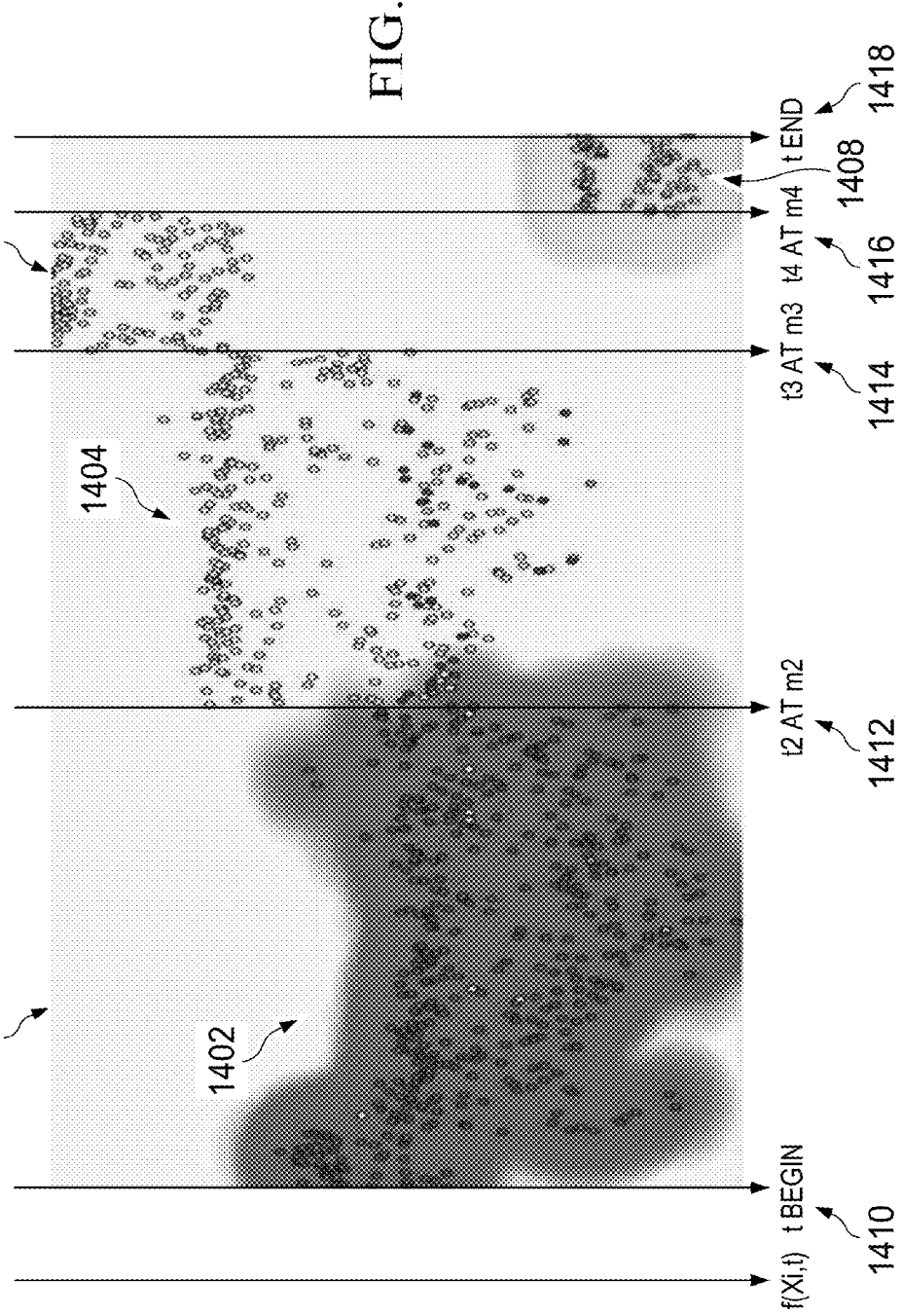
FIG. 14 is an illustration of a plurality of observations, in accordance with an illustrative embodiment.

FIG. 14 is an illustration of a plurality of observations, in accordance with an advantageous embodiment. FIG. 14 is similar to FIG. 6, but contains additional detail. Thus, for example, plurality of observations 1400 may be an example of one implementation of plurality of observations 510 in FIG. 5. Plurality of observations 1400 may comprise parameters for monitoring the health of a platform.

When taken as a set, a group of observations may compose a profile, such as the profiles described with respect to FIG. 12 and FIG. 13. An example of a profile might be, for example, group of observations 1402 that is taken between a beginning time, t begin 1410, and a second time t2 1412. Second time t2 1412 may be a particular time when a particular maintenance action or set of maintenance actions is performed. Data after second time t2 1412 may reflect all sensor and maintenance data at a particular time. A health assessment may be assigned to a group of observations. Thus, for example, group of observations 1402 between time t begin 1410 and second time t2 1412 may correspond to a health assessment of a "degraded health state" for which maintenance of the platform may be desirable. In this manner, FIG. 14 shows a visual representation by which a user may quickly evaluate a health status of a platform.

Similarly, group of observations 1404 between second time t2 1412 and third time t3 1414, after maintenance action m2 and before maintenance action m3, may reflect a "repair desirable" health state, in which a user may desire to more quickly take action to cause the platform to be repaired. Likewise, group of observations 1406 between third t3 1414 and fourth time t4 1416 may reflect a "faulty" health state for which one or more parts of the platform may be replaced, or for which the platform is not operating within desired parameters. Group of observations 1406 may be observations taken after maintenance action m3 but before maintenance action m4.

After maintenance action m4, another health assessment may be performed, between fourth time t4 1416 and end time $t_{end}$ 1418. Group of observations 1408 may indicate a "healthy" state of the platform after maintenance action m4.

Figure 15:
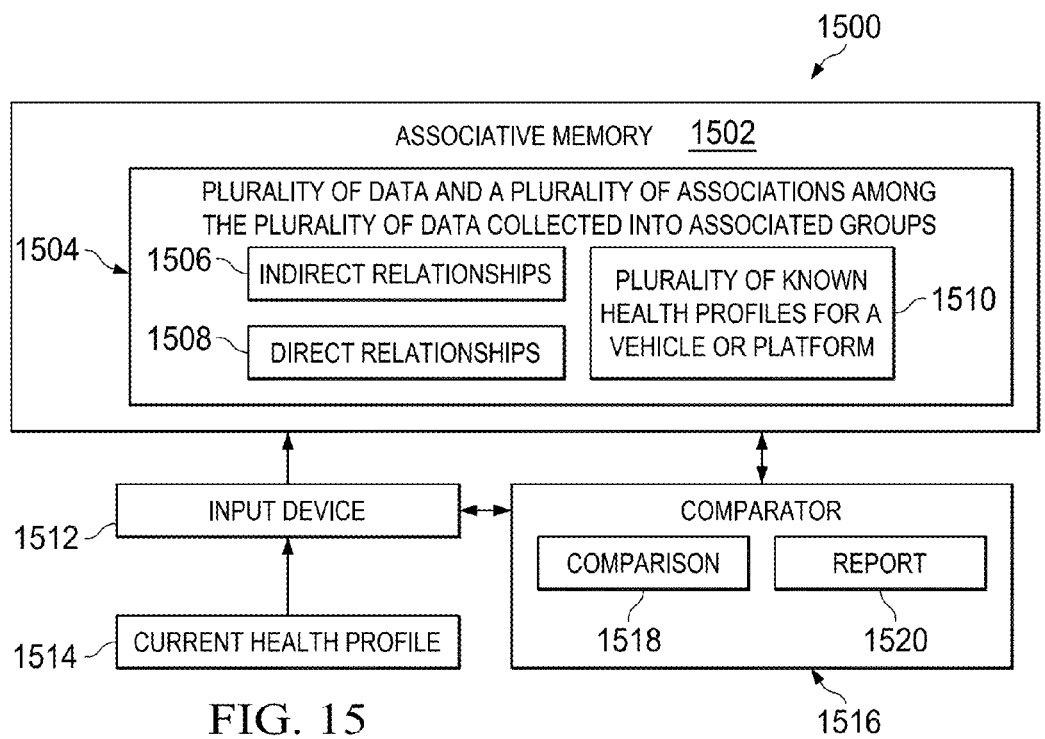
FIG. 15 is a block diagram of a health monitoring environment using an associative memory in accordance with an illustrative embodiment.

FIG. 15 is a block diagram of a health monitoring environment using an associative memory in accordance with an illustrative embodiment. Health monitoring environment 1500 may be a variation of health monitoring environment 300 of FIG. 3 or health monitoring system 1100 of FIG. 11. Health monitoring environment 1500 of FIG. 15 may be implemented using associative memory 1502, which may be for example associative memory 428 of FIG. 4.

In an illustrative embodiment, health monitoring environment 1500 may include associative memory 1502. Associative memory 1502 may include plurality of data and a plurality of associations among the plurality of data 1504. The plurality of data and their associations may be collected into associated groups. Associative memory 1502 may be configured to be queried based on at least indirect relationships 1506 among the plurality of data. Associative memory 1502 also may be queried based on direct relationships 1508 or both indirect relationships 1506 and direct relationships 1508 together. Associative memory 1502 also may store a plurality of known health profiles for a vehicle or platform 1510.

Health monitoring environment 1500 also may include input device 1512 in communication with associative memory 1502. Input device 1512 may be configured to receive current health profile 1514 of the vehicle or platform. Current health profile 1514 may be received from a variety of sources, including sensor data on the platform or off-board the platform, maintenance data such as from human operators or off-board or on-board sensors, or many other sources. In an illustrative embodiment, current health profile 1514 may be generated according to the procedures described with respect to FIG. 12 and FIG. 13.

Health monitoring environment 1500 also may include comparator 1516. Comparator 1516 may be one or more tangible processors, associative memory 1502 itself, or both operating together. Comparator 1516 may be configured to compare, in conjunction with associative memory 1502, current health profile 1514 with a plurality of known health profiles for a vehicle or platform 1510 to generate comparison 1518. Comparator 1516 further may be configured to generate, based on comparison 1518 and in conjunction with associative memory 1502, report 1520 on a current health of the vehicle or platform.

In an illustrative embodiment, current health profile 1514 may be sensor data obtained from a sensor disposed on the vehicle. Current health profile 1514 further may be maintenance data obtained from maintenance records derived from on-ground maintenance of the vehicle or platform. Current health profile 1514 further may be a record of an observation of the vehicle performed by a human, wherein the observation is different than the sensor data.

In an illustrative embodiment, comparing further includes identifying an indirect relationship between a first attribute in current health profile 1514 and a second attribute in a plurality of known health profiles for a vehicle or platform 1510. Other variations are possible.

In another variation, input device 1512 may be in communication with associative memory 1502, or with both associative memory 1502 and comparator 1516. Input device 1512 may be configured to receive sensor data relating to measurements taken by a sensor disposed on the platform. Input device 1512 further may be configured to receive maintenance data relating to maintenance of the platform, wherein the maintenance data is distinct from and unrelated to the sensor data. Comparator 1516 further may be configured to use both the sensor data and the maintenance data in conjunction with associative memory 1502 to generate a report of a health of the platform.

In an illustrative embodiment, the maintenance data may be a report submitted by a human. In an illustrative embodiment, the platform may be an aircraft and the sensor data may be information relating to conditions experienced by the aircraft during operation of the aircraft.

In an illustrative embodiment, associative memory 1502 may be part of an off-board computer system, such as on-board computer system 1104 of FIG. 11. In this case, the maintenance data may be a report submitted by human ground crew personnel. Additionally, the input device may be further configured to receive a plurality of additional information in a plurality of different formats. In this case, comparator 1516 further may be configured to use not only the sensor data and the maintenance data, but also the plurality of additional information, in conjunction with associative memory 1502 to generate the report.

In another illustrative embodiment, the platform may be an aircraft. In this case, the plurality of additional information may be selected from one or more of the group consisting of: a measurement of the aircraft by an off-board device, data from a flight system of the aircraft, a past maintenance record of the aircraft, a report by a pilot of the aircraft, a report by a ground crew operator responsible for maintaining the aircraft, a first profile of an ideal health of the aircraft, and a second profile of the aircraft in a condition for which maintenance is desired.

In another illustrative embodiment, comparator 1516 further may be configured to use not only the sensor data and the maintenance data, but also a known health profile of the platform, in conjunction with associative memory 1502 to generate the report. In another illustrative embodiment, the sensor data and the maintenance data may be part of one or more current health profiles of the platform. In this case, comparator 1516 further may be configured to generate the report by assigning a current health status of the platform based on a maximum similarity between the one or more current health profiles and the known health profile of the platform.

In another illustrative embodiment, comparator 1516 further may be configured to use associative memory 1502 to identify a potential cause of a component of the platform being outside of a set parameter. In this case, comparator 1516 may be configured to identify the potential cause based on the report, the sensor data, and the maintenance data. Other variations are possible.

Figure 16:
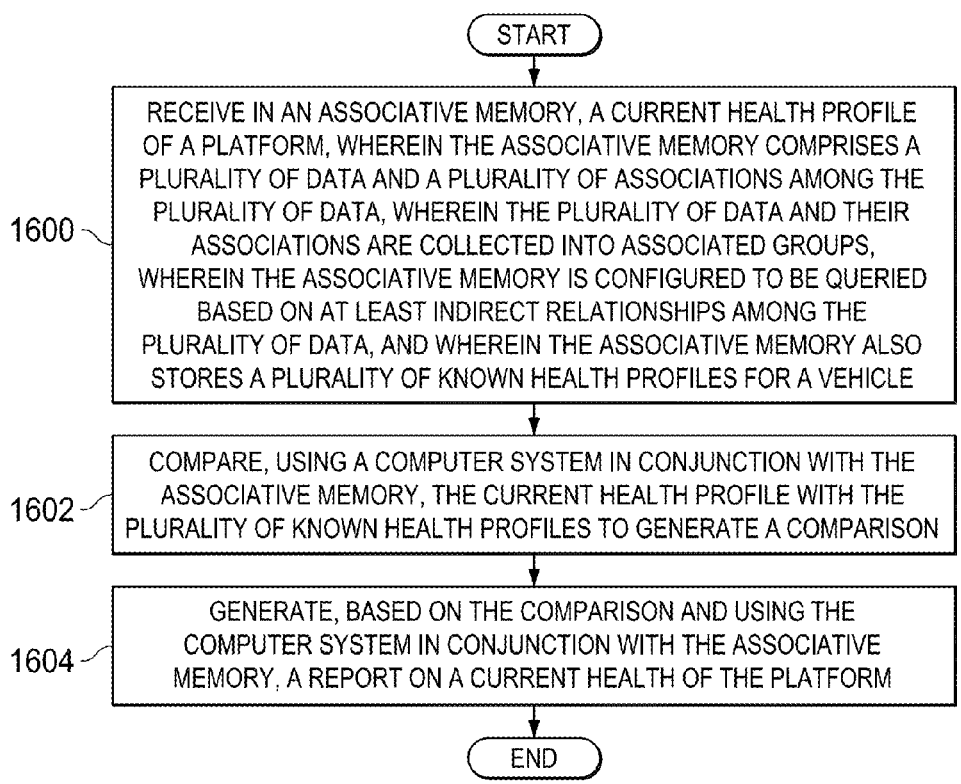
FIG. 16 is a flowchart of a process for monitoring a platform, in accordance with an illustrative embodiment.

FIG. 16 is a flowchart of a process for monitoring a platform, in accordance with an illustrative embodiment. The process shown in FIG. 16 may be implemented using health monitoring environment 300 of FIG. 3, health monitoring system 1100 of FIG. 11, or health monitoring environment 1500 of FIG. 15. The process shown in FIG. 16 may be a variation of the process shown in FIG. 7 through FIG. 10, or FIG. 12. The process shown in FIG. 16 may be implemented using an associative memory, such as associative memory 428 of FIG. 4 and one or more processors, such as processor unit 404 in FIG. 4. Although the operations presented in FIG. 16 are described as being performed by "a process," the operations are being performed by at least one tangible processor or using one or more physical devices, as described elsewhere herein.

The process receives in an associative memory, a current health profile of a vehicle, wherein the associative memory comprises a plurality of data and a plurality of associations among the plurality of data, wherein the plurality of data and their associations are collected into associated groups, wherein the associative memory is configured to be queried based on at least indirect relationships among the plurality of data, and wherein the associative memory also stores a plurality of known health profiles for a vehicle (operation 1600). The process then compares, using a computer system in conjunction with the associative memory, the current health profile with the plurality of known health profiles to generate a comparison (operation 1602). The process then generates, based on the comparison and using the computer system in conjunction with the associative memory, a report on a current health of the vehicle (operation 1604). The process may terminate thereafter.

In an illustrative embodiment, the current health profile may be sensor data obtained from a sensor disposed on the vehicle. In this case, the current health profile further may be maintenance data obtained from maintenance records derived from on-ground maintenance of the vehicle. Still further, the current health profile further may be a record of an observation of the vehicle performed by a human. In yet another illustrative embodiment, comparing may further include identifying an indirect relationship between a first attribute in the current health profile and a second attribute in the plurality of known health profiles. Other variations are possible.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, or portion of computer-usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, in some illustrative embodiments, the selection of a health state in operation 1002 may be performed after the creation of the known profile in operation 1010. With this type of process, the known profile may be associated with a health state after the known profile is created. Further, the selection of the health state for the known profile may be based on training information and/or maintenance information.

Thus, the different illustrative embodiments provide a method and apparatus for monitoring a platform. In one illustrative embodiment, an apparatus comprises a computer system and a sensor network. The sensor network is associated with a platform. The computer system is connected to the sensor network and is configured to receive information from the sensor network. The computer system is configured to form observations from the information for a current profile. The computer system compares the current profile with a number of known profiles to identify a health state of the platform.

The different illustrative embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer readable or usable program code such that when the computer readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The illustrative embodiments may take different forms. For example, the illustrative embodiments may provide for an apparatus. The apparatus may include a sensor network associated with a platform in which the sensor network is configured to monitor health of the platform. The apparatus may also include a number of systems associated with the platform in which the number of systems and the sensor network are configured to provide information for the platform. The apparatus may also include a computer system connected to the sensor network and the number of systems in which the computer system is configured to receive the information, process the information to form a plurality of observations from the information, and create a current profile from the plurality of observations and the information in which the current profile is used to identify a health state for the platform.

In another illustrative embodiment, the computer system is in a location remote to the platform and is connected to the sensor network and the number of systems through another computer system on the platform. In another illustrative embodiment, the computer system is configured to perform a number of operations selected from at least one of receiving at least a portion of the information from the number of systems for the platform; grouping observations in the plurality of observations based on similarities between the observations, in which a number of groups are created to form the current profile; identifying a number of pieces of information in the information; creating an observation from each piece of information in the number of pieces of information to form the plurality of observations; placing the plurality of observations in an associative memory in the computer system to form the current profile for the associative memory; receiving training information obtained during a known health state of the platform to create a known profile in a number of known profiles; using the maintenance information and the current profile to identify a potential cause of the health state for the platform; and selectively generating an alert based on the health state of the platform.

In another illustrative embodiment, the apparatus may further include the number of systems, wherein the number of systems comprises at least one of a navigation system, avionics for an aircraft, an environmental control system, a surface control system, a flight control system, a drive system, a landing system, and a propulsion system. In another illustrative embodiment, the computer system creates the current profile from the plurality of observations by analyzing the associative memory in the computer system. In another illustrative embodiment, the training information comprises information previously collected for the platform, maintenance information about the platform, and timestamps of the information previously collected for the platform.

In another illustrative embodiment, in creating the current profile, the computer system is further configured to select a portion of the plurality of observations based on a number of maintenance events performed for the platform to create the current profile. In another illustrative embodiment, the computer system is further configured to associate metadata with the information. In another illustrative embodiment, the computer system is further configured to select the portion of the plurality of observations using the number of maintenance events and the metadata. In another illustrative embodiment, the metadata is comprised of at least one of a timestamp for a piece of information and an identifier of a source of the piece of information.

In another illustrative embodiment, the training information for the known health state comprises the information received from one of before a selected date information, after the selected date information, and during a period of time information. In another illustrative embodiment, a portion of the information is received from a maintenance database in the number of systems. In another illustrative embodiment, the information comprises at least one of data, commands, and messages.

In another illustrative embodiment the apparatus may also include the platform, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a wind turbine, a manufacturing system, a building, a wing, a stabilizer, an engine, a hydraulic system, a power transmission gear box, and a shaft.

The illustrative embodiments also provide for a system for monitoring health of a platform. The system includes a sensor network associated with the platform. The system also includes a number of systems associated with the platform. The number of systems and the sensor network are configured to provide information for the platform. The system also includes a computer system associated with the platform in which the computer system is in communication with the sensor network and the number of systems and is configured to receive the information from the sensor network and the number of systems associated with the platform, process the information to form a plurality of observations from the information, group the plurality of observations into a number of groups based on similarities between observations in the plurality of observations to form a current profile, compare the current profile to a number of known profiles to form a comparison, and identify a health state of the platform using the comparison. In an illustrative embodiment, the platform is an aircraft.

The illustrative embodiments also provide for a method. The method may include receiving information from monitoring the platform, wherein the information is received from a sensor network and a number of systems associated with the platform. The method may also include forming a plurality of observations from the information. The method may also include creating a profile from the plurality of observations in which the profile is used to monitor the platform.

In an illustrative embodiment, the step of forming the plurality of observations from the information comprises identifying a number of pieces of information in the information and creating an observation from each piece of information in the number of pieces of information to form the plurality of observations. In an illustrative embodiment, the profile is selected from one of a current profile and a known profile and wherein the step of creating the profile comprises: grouping observations in the plurality of observations to form a number of groups based on similarities between the observations in the plurality of observations. In an illustrative embodiment, the method also includes associating metadata with the information, wherein the metadata comprises at least one of a timestamp for a piece of information and an identifier of a source of the piece of information.

The description of the different illustrative embodiments has been presented for purposes of illustration and description, and it is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring a platform, the method comprising:
    receiving information from monitoring the platform including training information obtained during a known health state of the platform by an input/output device and a communications unit that provides communications through the use of either or both physical and wireless communications links, wherein the information is received from a sensor network and a number of systems associated with the platform;
    forming a plurality of observations from the information including the received training information to create a known profile in a number of known profiles;
    creating associations between pieces of the information in an associative memory from metadata of the plurality of observations; and
    creating a profile in the associative memory from the associations from the plurality of observations based on maintenance information and metadata used to select the portion of plurality of observations that are formed after replacement of a part, in which the profile is used to monitor the platform.

2. The method of claim 1, wherein the step of forming the plurality of observations from the information comprises:
    identifying a number of pieces of information in the information; and
    creating an observation from each piece of information in the number of pieces of information to form the plurality of observations.

3. The method of claim 1, wherein the profile is selected from one of a current profile and a known profile and wherein the step of creating the profile comprises:
    grouping observations in the plurality of observations to form a number of groups corresponding to degraded health state, needs repair health state, faulty health state, and repair state based on similarities between the observations in the plurality of observations.

4. The method of claim 1, further comprising:
    associating the metadata with the information, wherein the metadata comprises at least one of a timestamp for a piece of information and an identifier of a source of the piece of information.

5. An apparatus for a platform including a health monitoring system comprising:
    a sensor network associated with the platform in which the sensor network is configured to monitor health of the platform;
    a number of systems associated with the platform in which the number of systems and the sensor network are configured to provide information for the platform; and
    a computer system connected to the sensor network, and the number of systems in which the computer system is configured to receive the information and process the information, wherein the apparatus provides an improvement in scoring a plurality of observations in the information received, characterized in that:
    an associative memory is connected to the computer system and is configured to create associations from the plurality of observations using metadata from the plurality of observations from the information including the received training information to create a known profile in a number of known profiles, and to create a current profile in the associative memory from a portion of the plurality of observations based on maintenance information and the metadata used to select associations from the portion of the plurality of observations that are formed after replacement of a part in the platform;
    wherein the associative memory is further configured to use information in the current profile to identify a health state for the platform in groups corresponds to a degraded health state, a needs repair health state, a faulty health state, and a repair state.

6. The apparatus of claim 5, wherein the computer system is in a location remote to the platform and is connected to the sensor network and the number of systems through another computer system on the platform.

7. The apparatus of claim 5, wherein the computer system is further configured to:
    receive at least a portion of the information from the number of systems for the platform;
    identify a number of pieces of the information in the information;
    create an observation from each piece of information in the number of pieces of the information to form the portion of the plurality of observations;
    selectively generate an alert based on the health state of the platform.

8. The apparatus of claim 5 wherein the number of systems comprises at least one of a navigation system, avionics for an aircraft, an environmental control system, a surface control system, a flight control system, a drive system, a landing system, and a propulsion system.

9. The apparatus of claim 7, wherein the computer system is configured to create the current profile from the portion of the plurality of observations by analyzing the associative memory in the computer system.

10. The apparatus of claim 7, wherein the training information comprises information previously collected for the platform, maintenance information about the platform, and timestamps of the information previously collected for the platform.

11. The apparatus of claim 5, wherein the metadata is comprised of at least one of a timestamp for a piece of information and an identifier of a source of the piece of information.

12. The apparatus of claim 5, wherein the training information for the known health state comprises the information received from one of before a selected date information, after the selected date information, and during a period of time information.

13. The apparatus of claim 5, wherein a portion of the information is received from a maintenance database in the number of systems.

14. The apparatus of claim 5, wherein the information comprises at least one of data, commands, and messages.

15. The apparatus of claim 5 further comprising:
the platform, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a wind turbine, a manufacturing system, a building, a wing, a stabilizer, an engine, a hydraulic system, a power transmission gear box, and a shaft.

16. A system for monitoring health of a platform, the system comprising:
a sensor network associated with the platform;
a number of systems associated with the platform, wherein the number of systems and the sensor network are configured to provide information for the platform, wherein a plurality of observations is in the information; and
a computer system associated with the platform in which the computer system is in communication with the sensor network and the number of systems and is configured to receive the information including training information obtained during a known health state of the platform from the sensor network and the number of systems associated with the platform, to create associations between pieces of the information in an associative memory responsive to metadata in the plurality of observations; to process the information in the associative memory to create a known profile in a number of known profiles, to group the plurality of observations into a number of groups based on similarities between ones of individual observations in the plurality of observations to form a current profile based on maintenance information and metadata used to select a portion of the plurality of observations that are formed after replacement of a part in the platform, to compare the current profile to a number of known profiles to form a comparison, and to identify a health state of the platform in groups corresponding to a degraded health state, a needs repair health state, a faulty health state, and a repair state using the comparison.

17. The system of claim 16, wherein the platform is an aircraft.

* * * * *